A. HOCH.
ADDING MACHINE.
APPLICATION FILED JUNE 23, 1905.
1,004,877.
Patented Oct. 3, 1911.
16 SHEETS—SHEET 10.
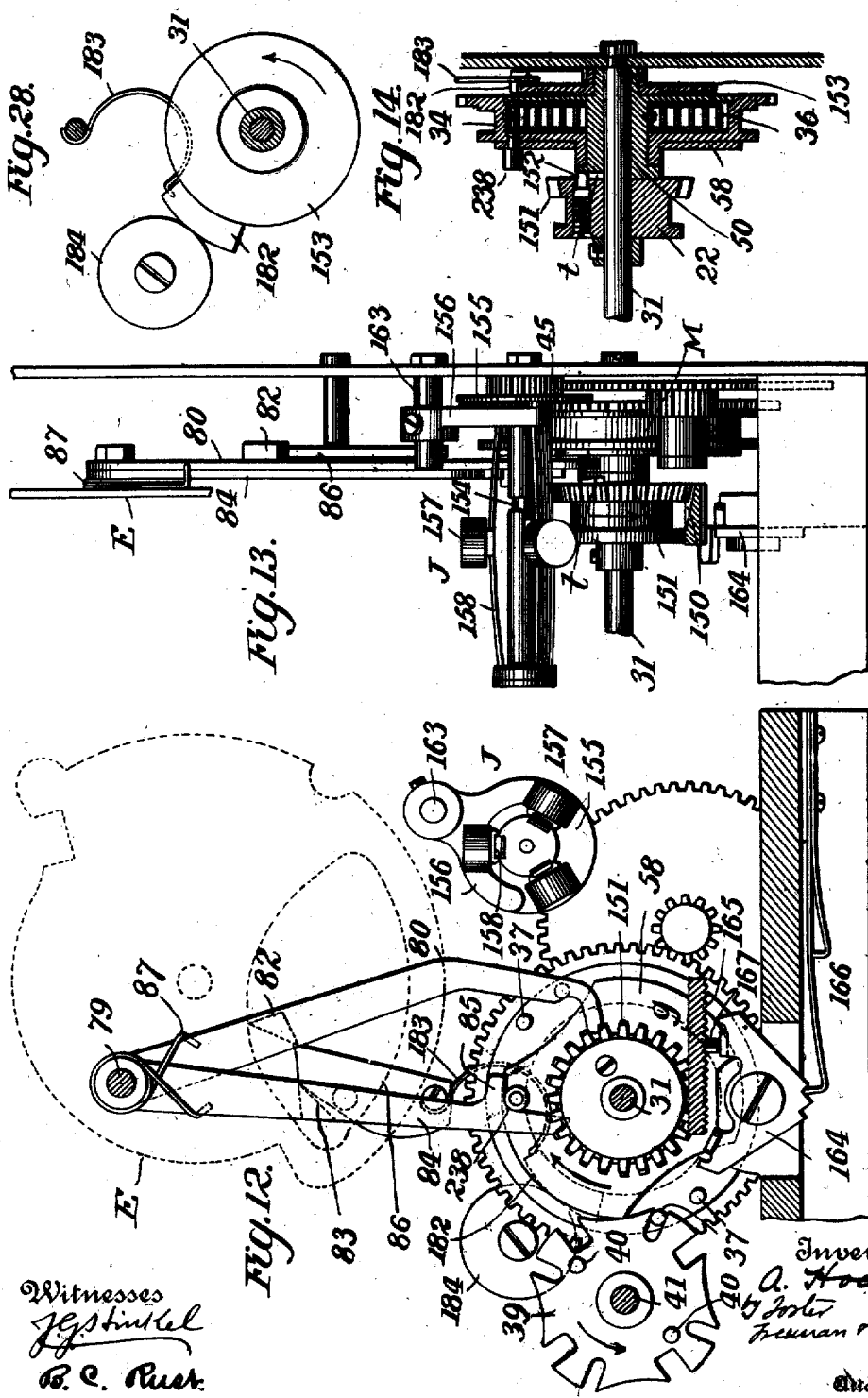

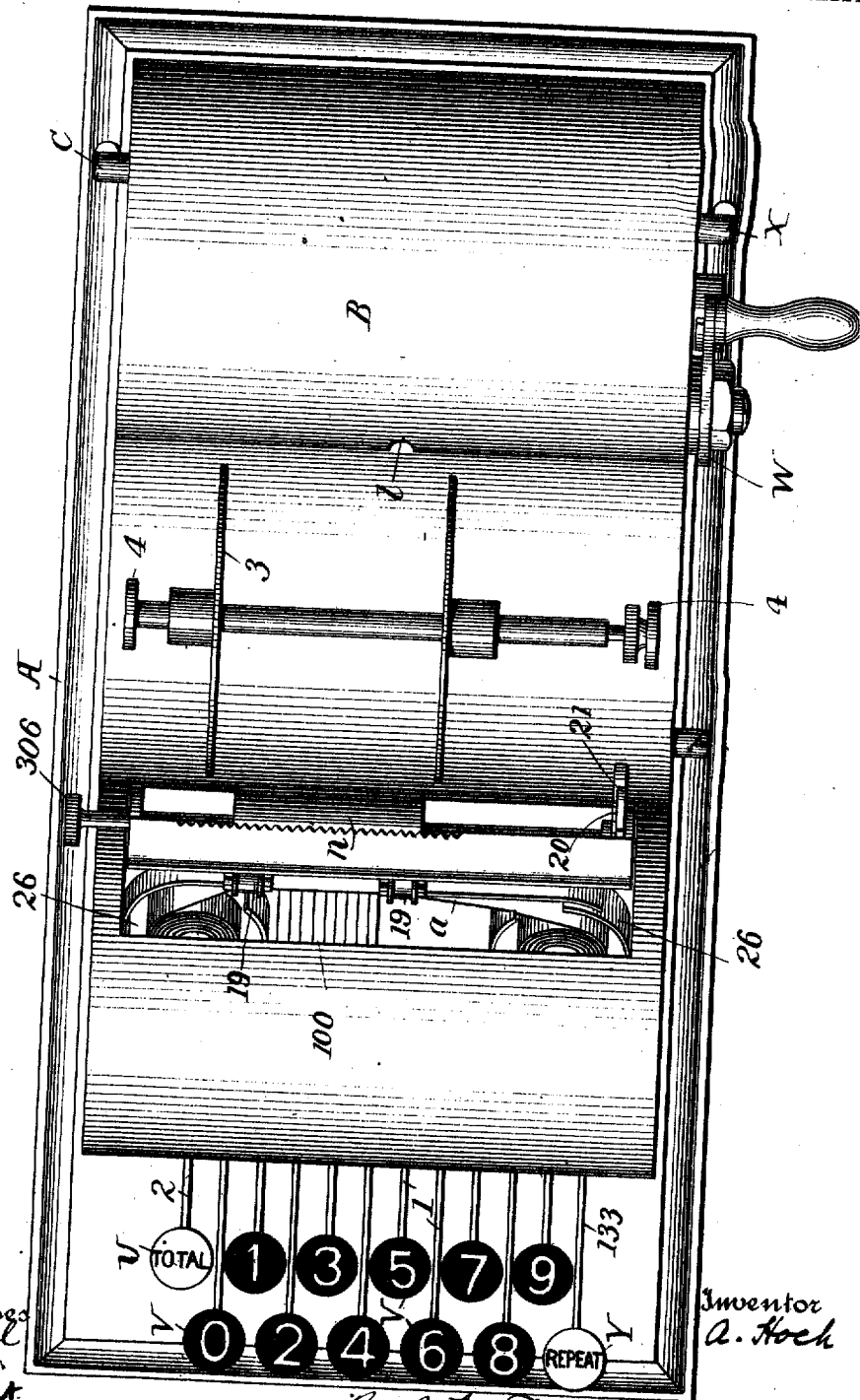

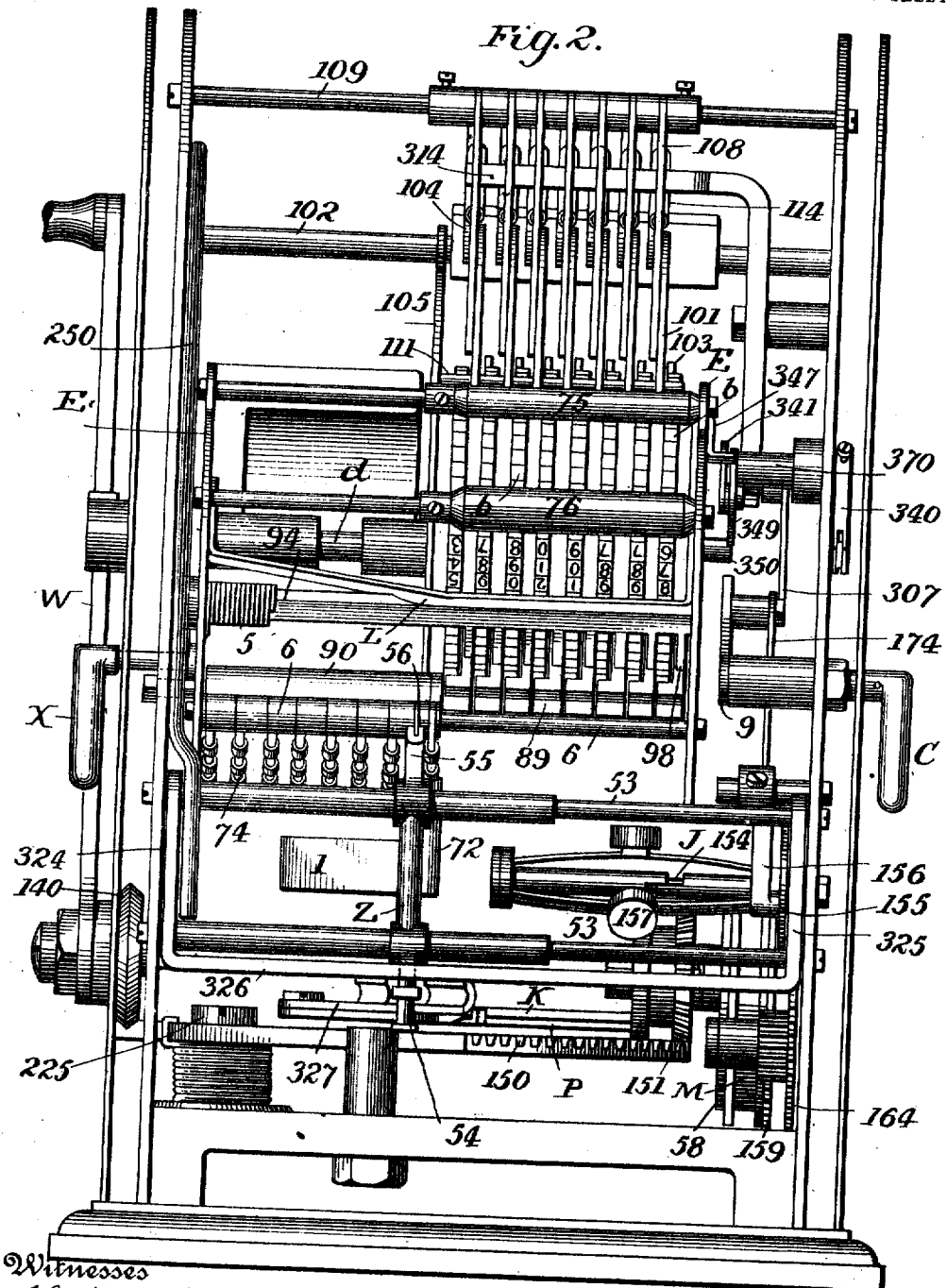

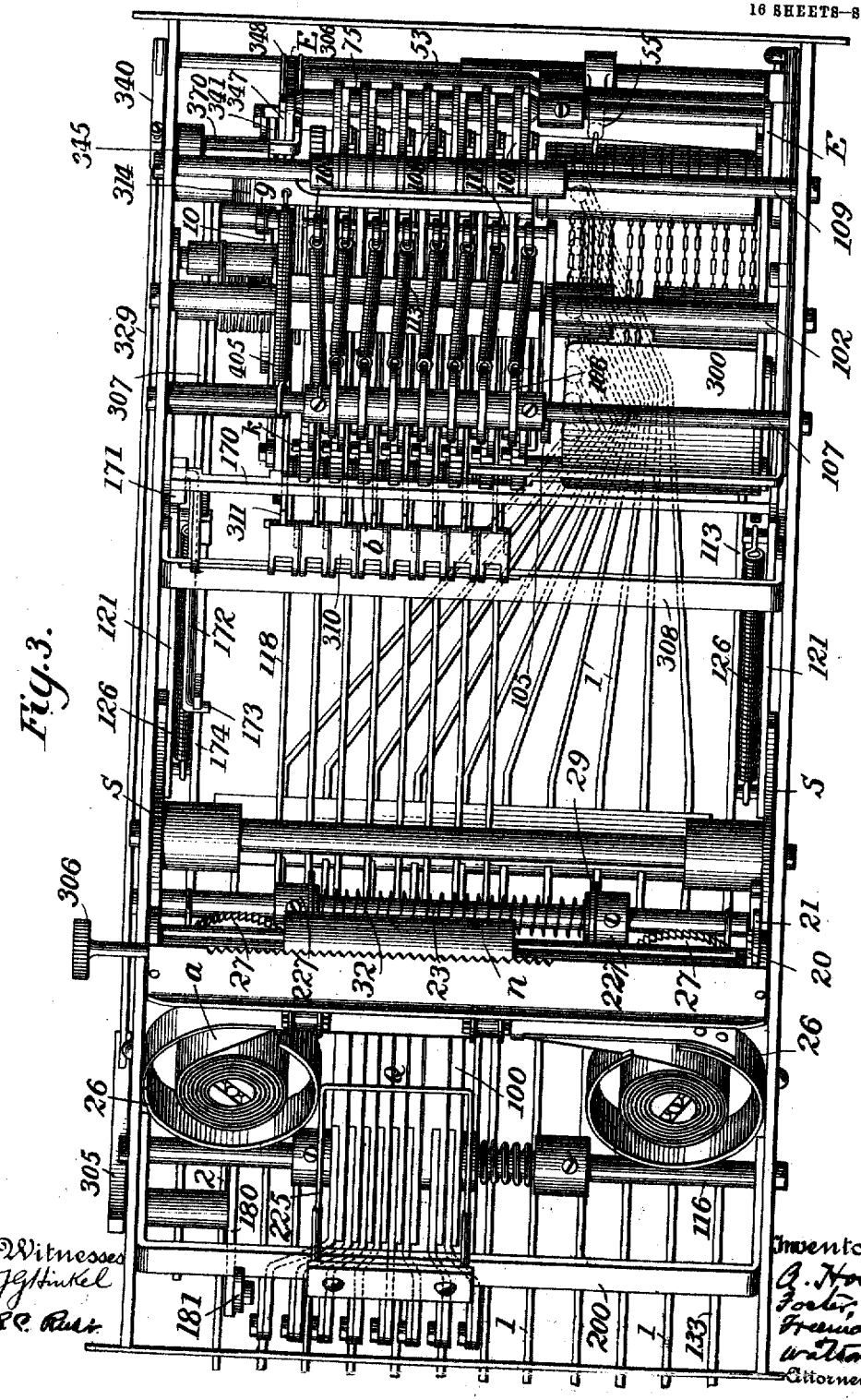

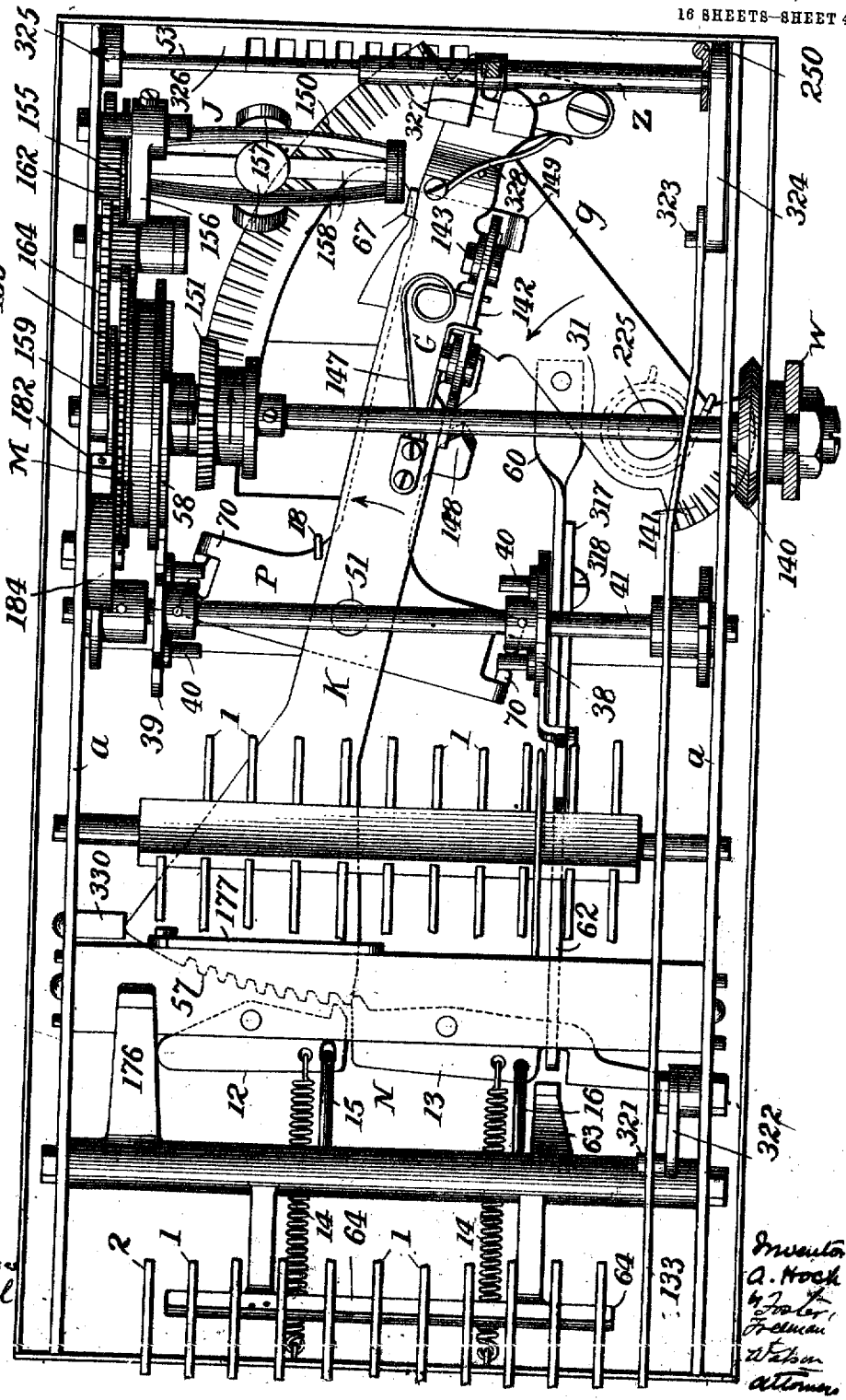

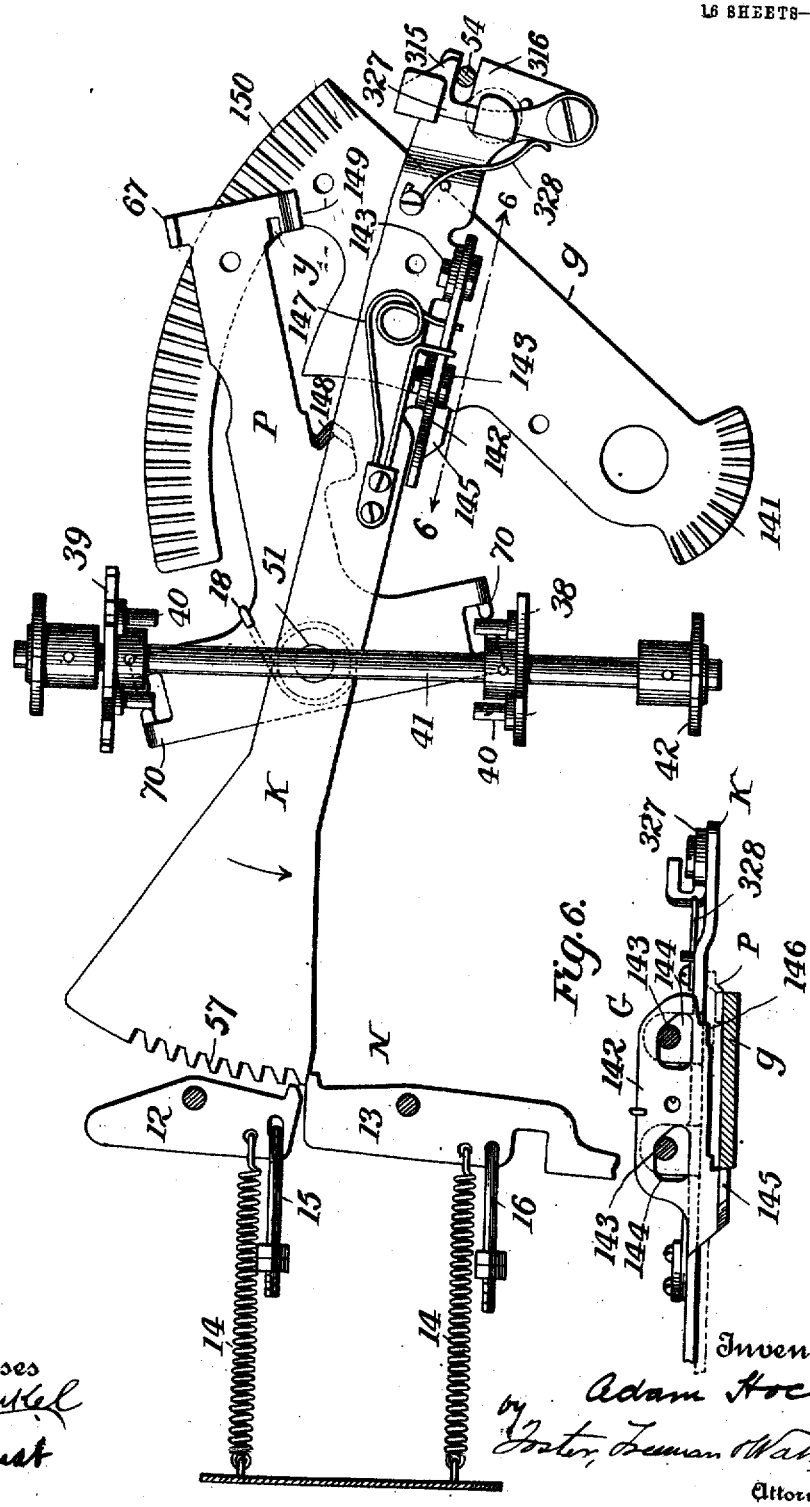

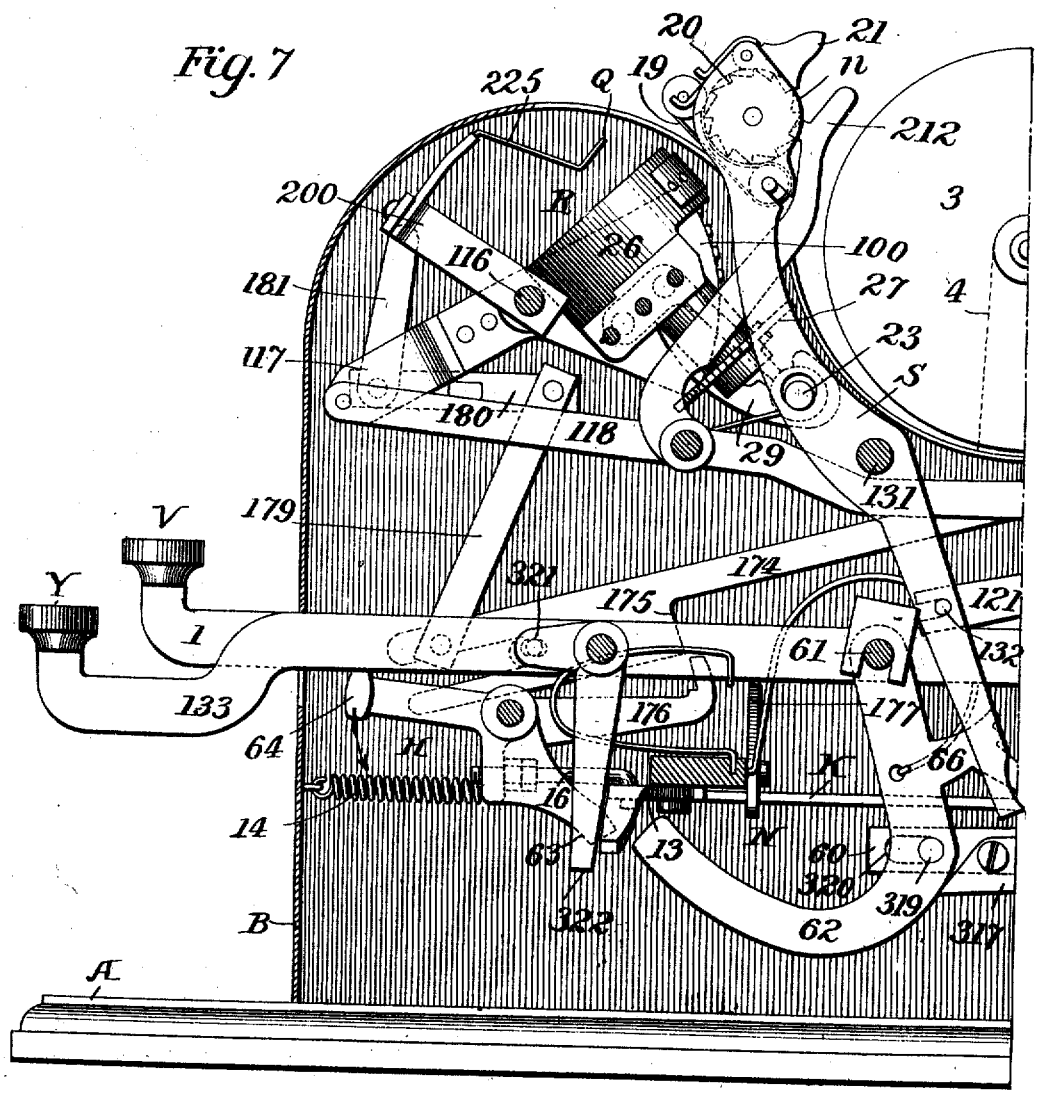

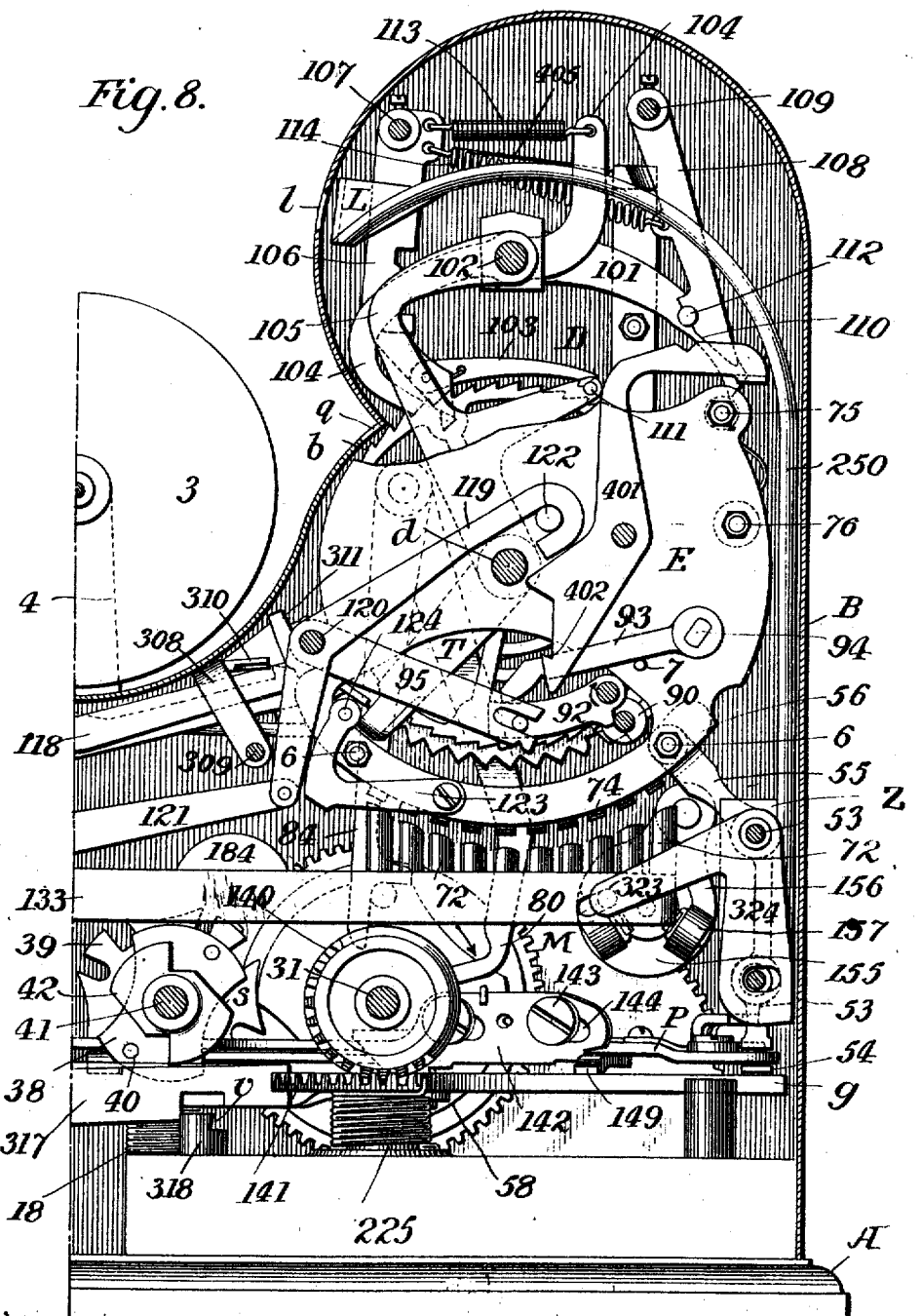

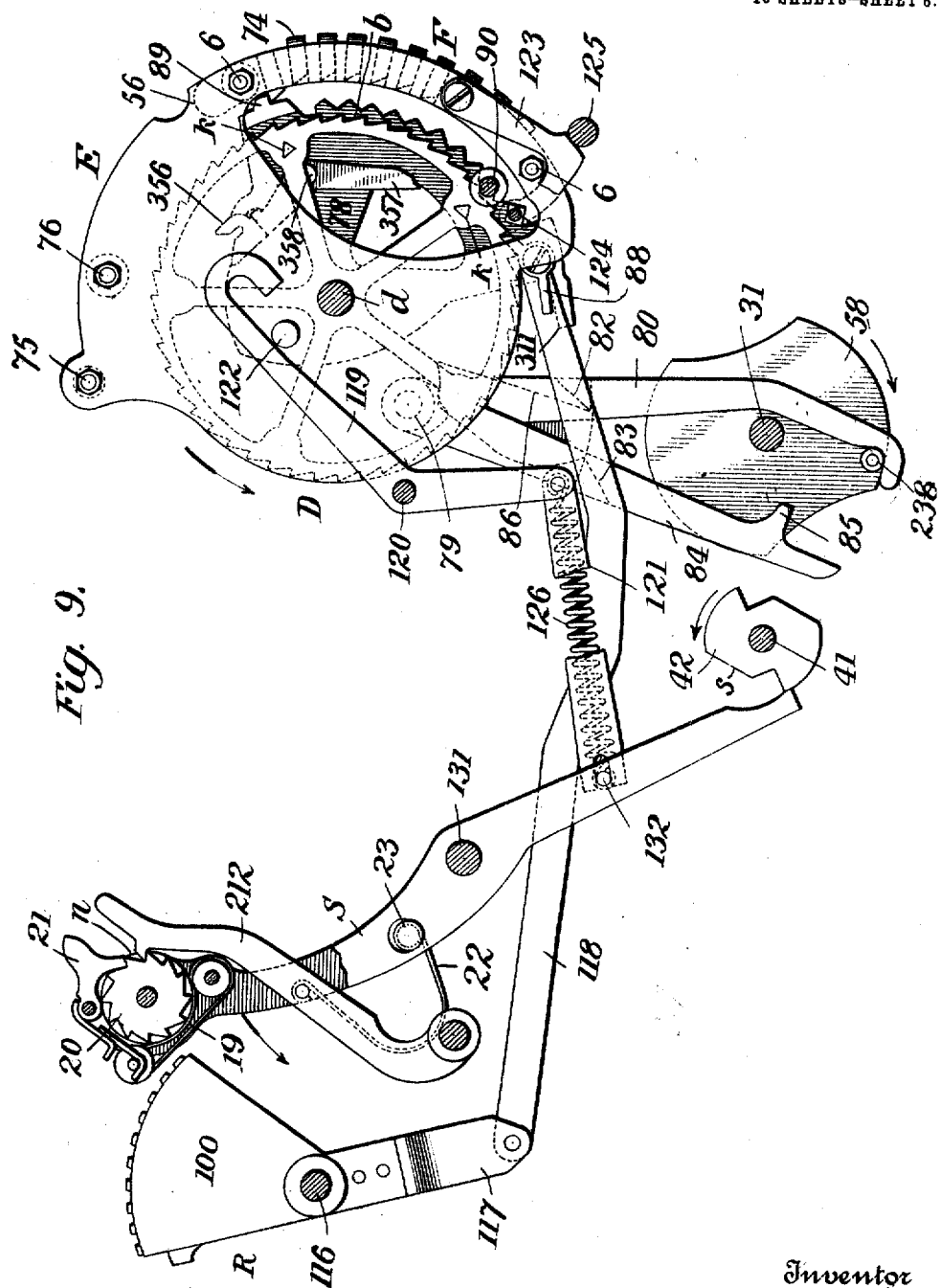

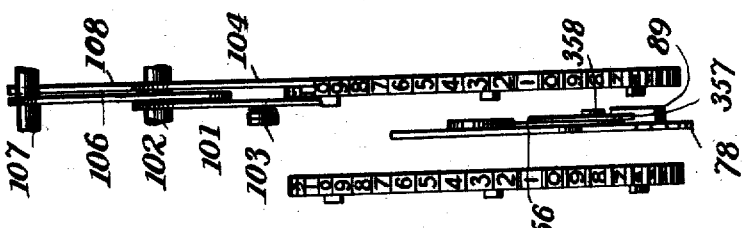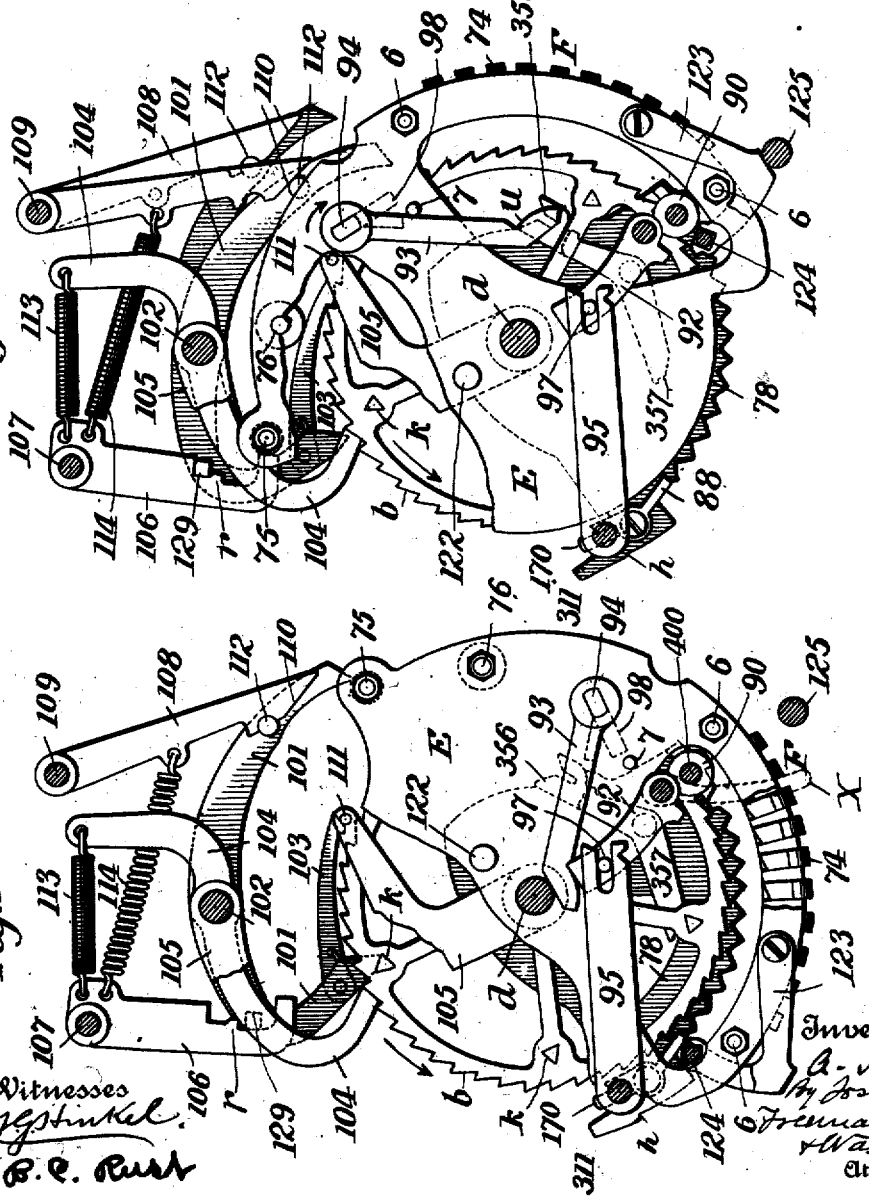

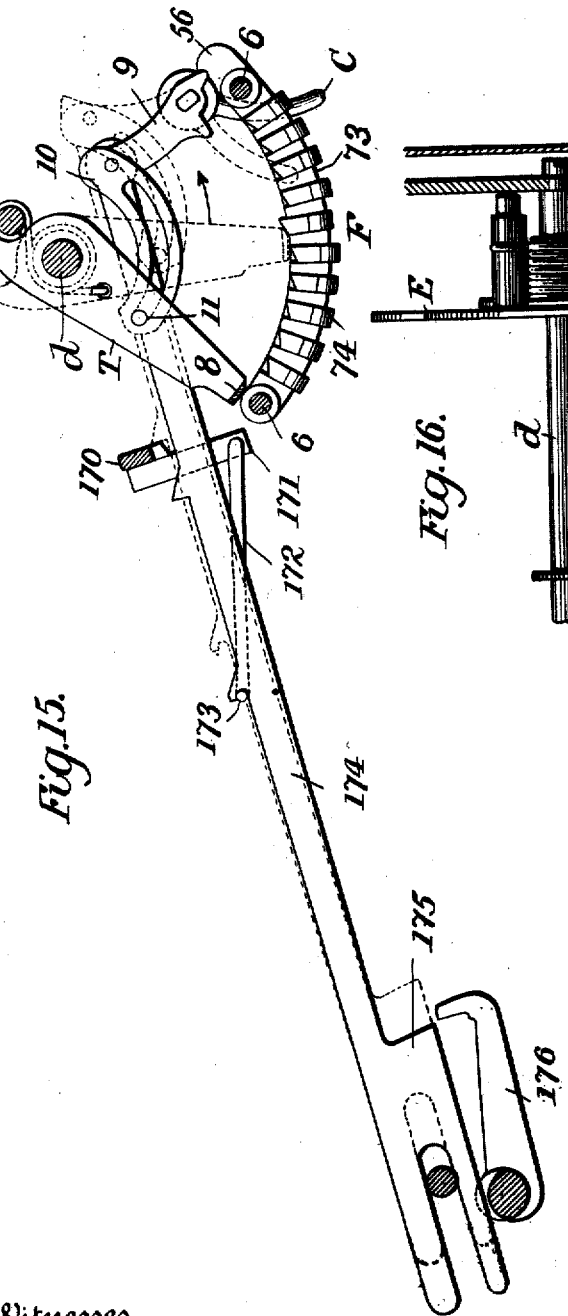

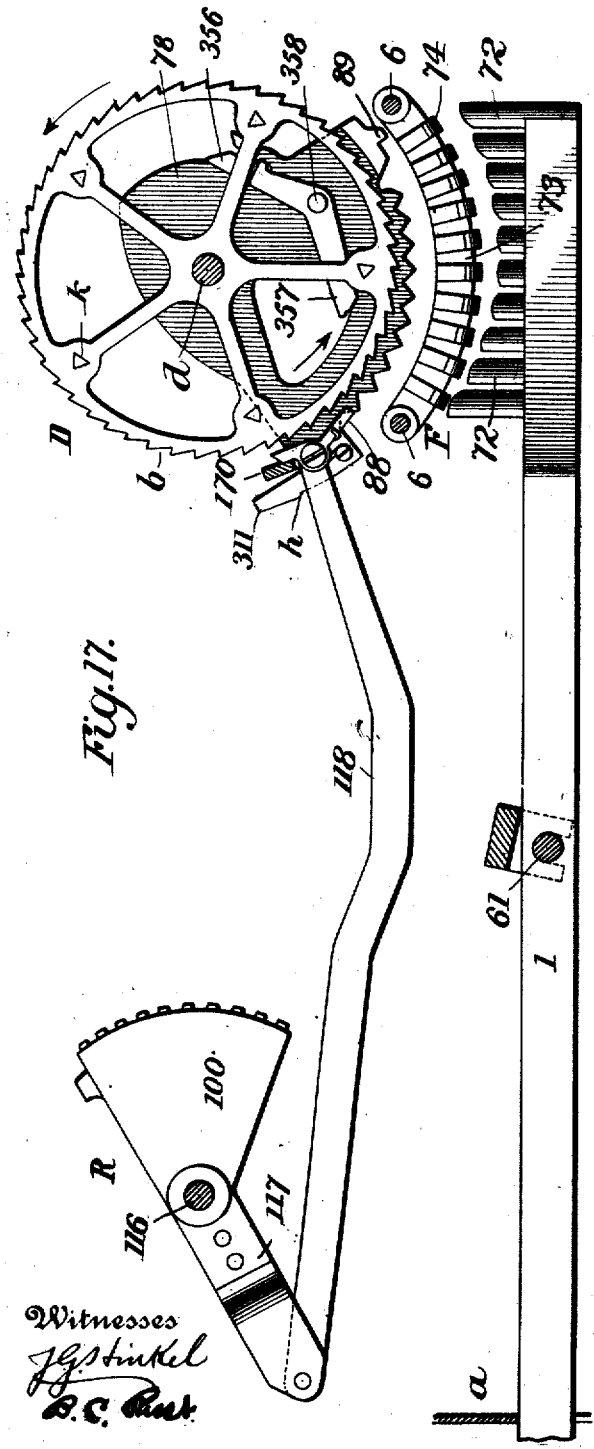
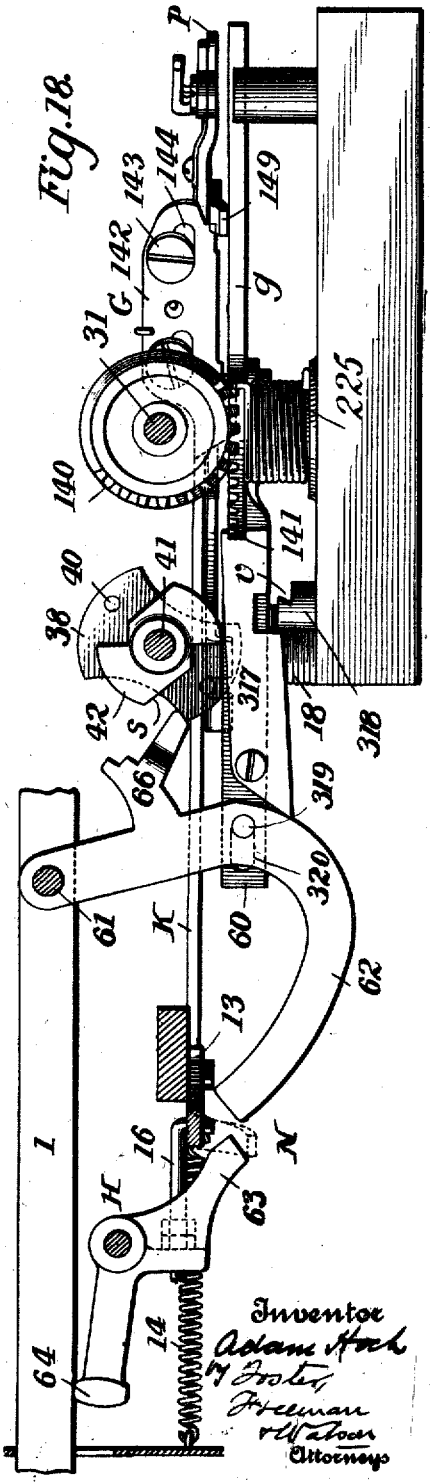

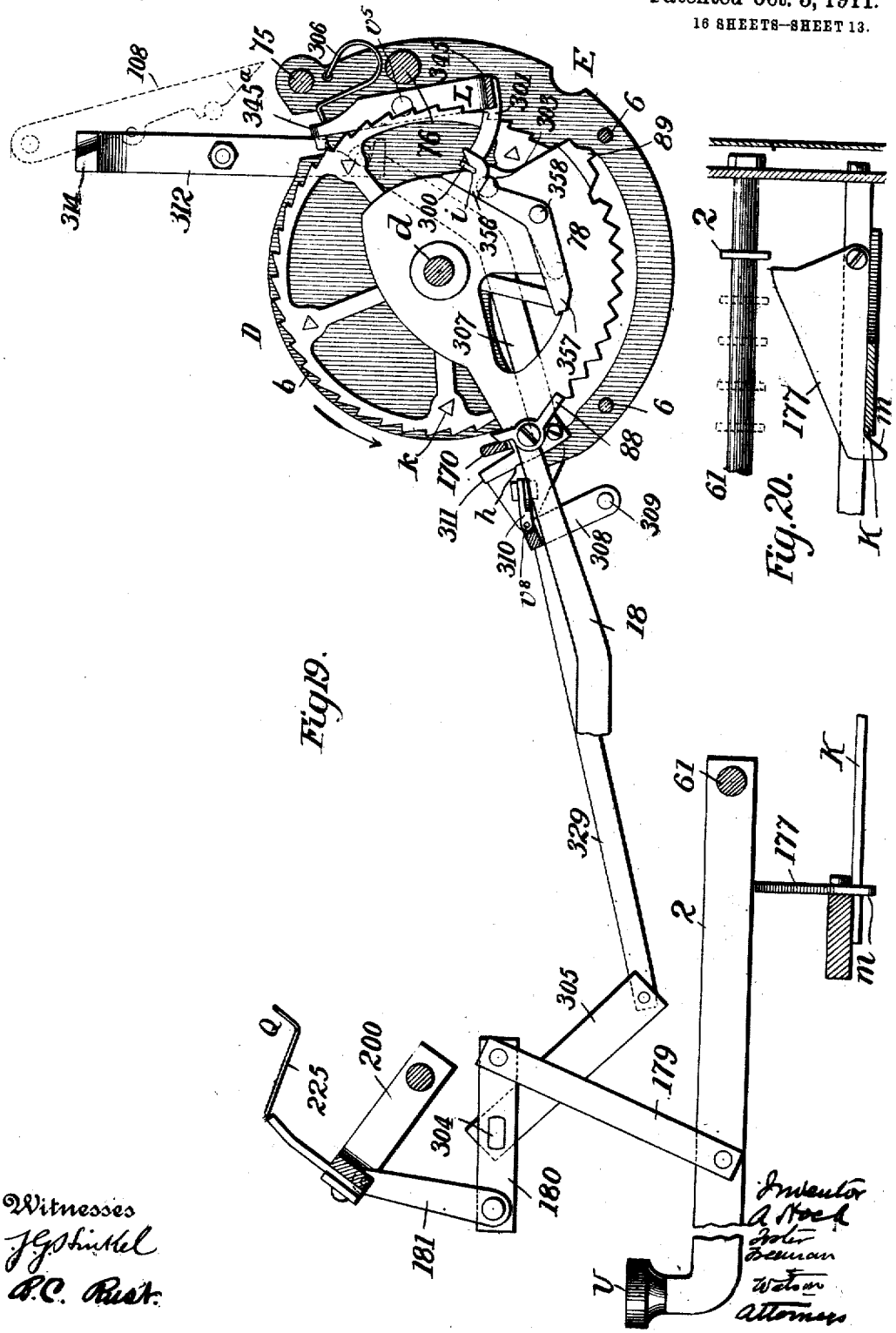

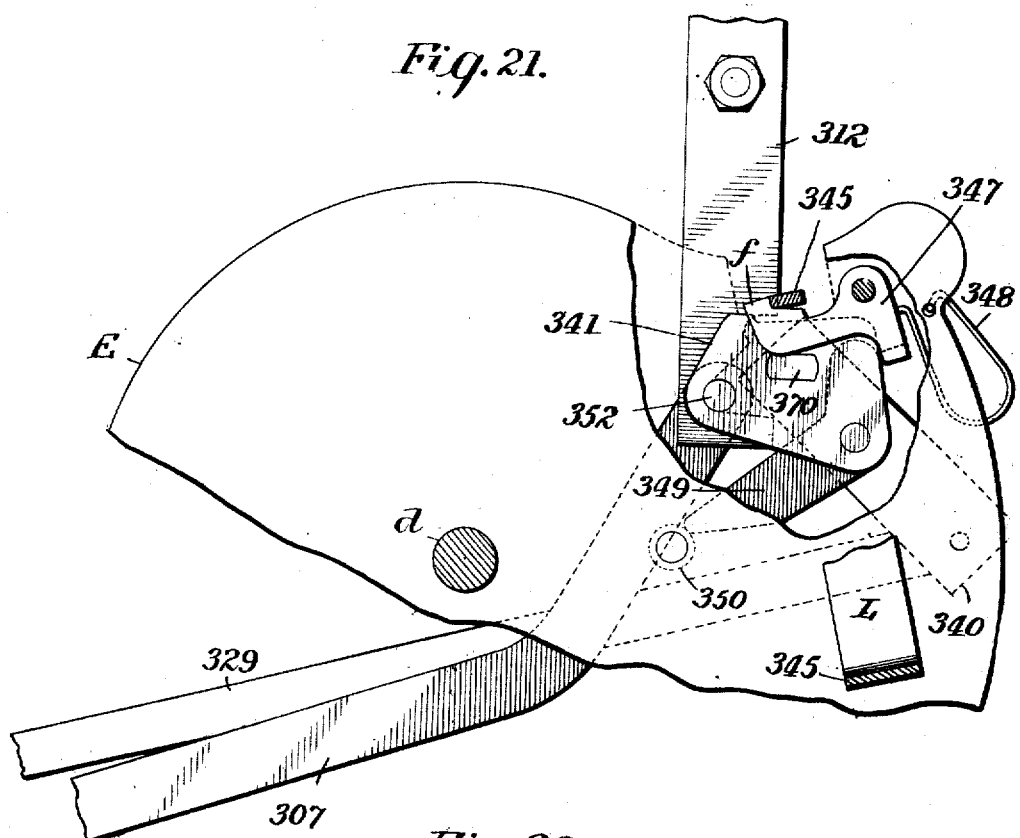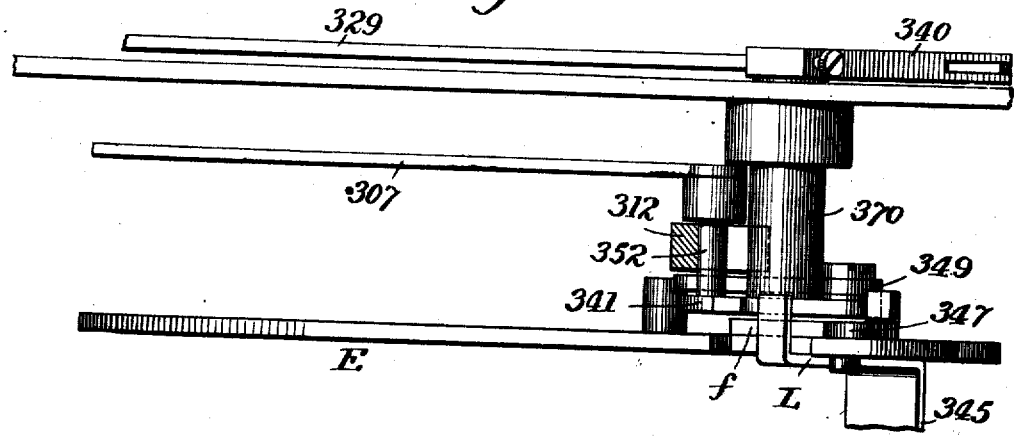

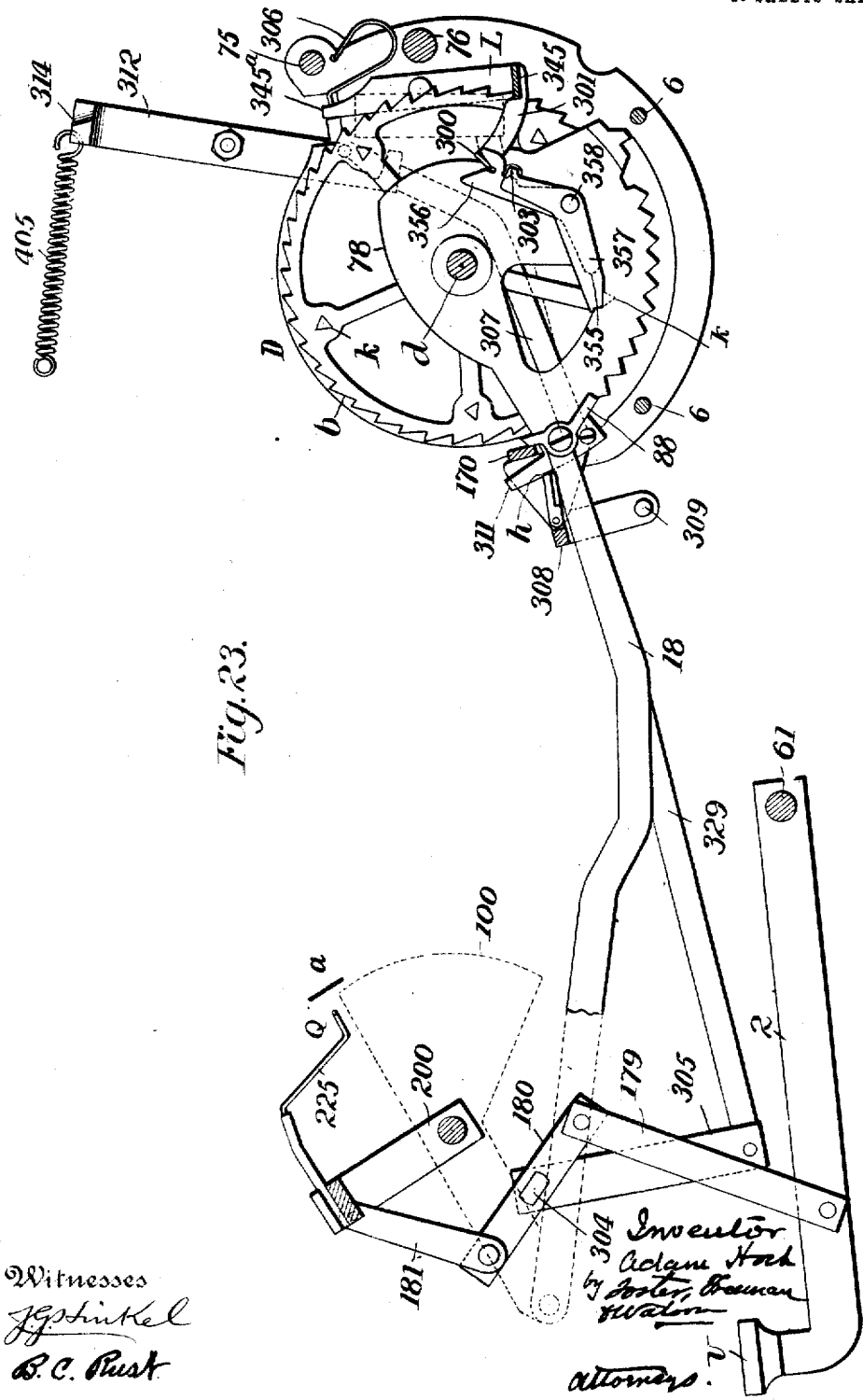

UNITED STATES PATENT OFFICE.

ADAM HOCH, OF SAN FRANCISCO, CALIFORNIA, ASSIGNOR TO WENDLING-HOCH ADDING MACHINE COMPANY, OF SAN FRANCISCO, CALIFORNIA, A CORPORATION OF CALIFORNIA.

ADDING-MACHINE.

1,004,877.  Specification of Letters Patent.  Patented Oct. 3, 1911.

Application filed June 23, 1905. Serial No. 266,604.

*To all whom it may concern:*

Be it known that I, ADAM HOCH, a citizen of the United States, residing at San Francisco, in the county of San Francisco and State of California, have invented certain new and useful Improvements in Adding-Machines, of which the following is a specification.

My invention relates to apparatus for adding and recording the numbers added and their totals and more especially to that type of apparatus illustrated in my Letters Patent Nos. 696,141 and 712,795, and consists of certain mechanisms, devices and details for securing economy and simplicity of construction and certainty of operation, as fully set forth hereinafter and as illustrated in the accompanying drawings, in which—

Figure 24:
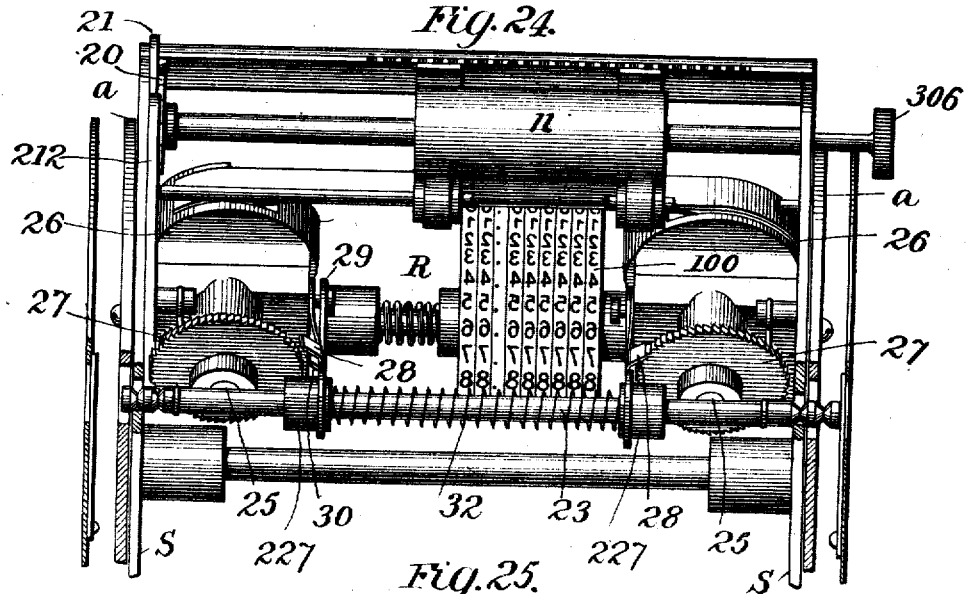
Figure 25:
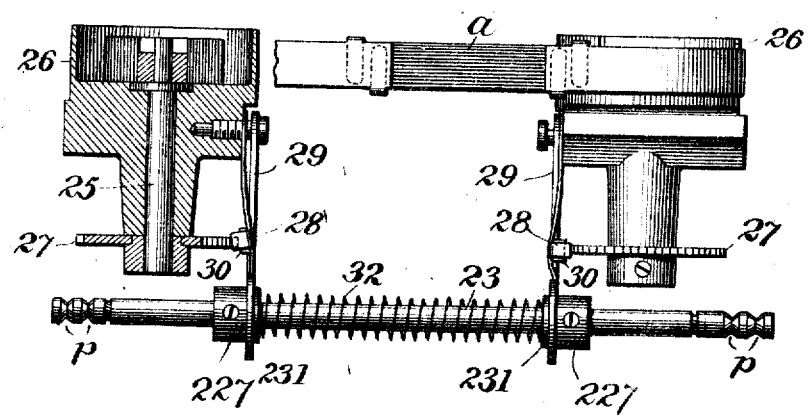
Figure 26:
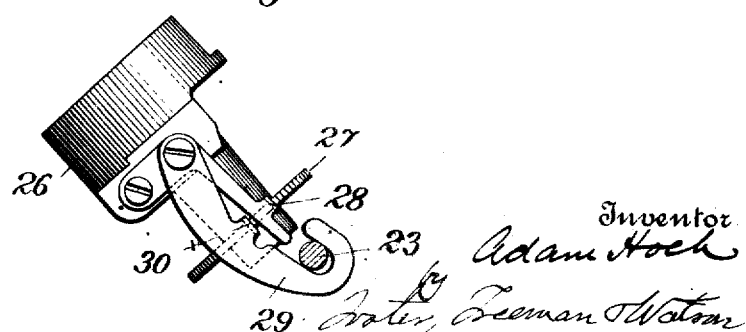

Figure 1 is a plan view of an adding machine embodying my improvements; Fig. 2 is a rear elevation, the case removed; Fig. 3, a plan with the case removed, the parts below the adder omitted; Fig. 4, a plan, the case in section, of the parts below the adder and recorder; Fig. 5, a plan of parts for actuating the selector from the keys; Fig. 6, a part sectional view on the line 6—6, Fig. 5; Figs. 7 and 8 together are a longitudinal sectional elevation; Fig. 9, a side elevation of detached parts showing mainly connections between the adder and recorder; Fig. 10, a side view of the adder mechanism showing the parts in position before adding; Fig. 11, the same as Fig. 10, showing the parts in position after adding; Fig. 12, a side view, in part section, of the motor and adjuncts; Fig. 13, a rear view of the parts shown in Fig. 12; Fig. 14, a sectional view through the motor casing; Fig. 15, a detached side view showing the restoring device and key stop; Fig. 16, a transverse section of the selector showing parts of the zero device; Fig. 17, a side elevation illustrating the relation of the key levers, adder and recorder; Fig. 18, an elevation illustrating locking features coöperating with the key levers and hand lever operated devices; Fig. 19, a side view of parts of the adder and recorder total key and connections; Fig. 20, a section on the line 20, Fig. 19; Fig. 21, an enlarged side view of parts connected with the totalizing mechanism; Fig. 22, a plan of the parts in Fig. 21; Fig. 23, a side view of the parts more immediately connected with the adder wheels for printing totals; Fig. 24, a plan of the recorder; Fig. 25, a sectional view of parts of the ribbon feed devices; Fig. 26, a side view of part of the ribbon feed devices; Fig. 27, an edge view of two adder wheels and adjuncts; Fig. 28, a detached view of the motor stop device.

The machine has a base A supporting the frame containing the working parts, which are inclosed by a casing B, through the front end of which project key levers 1 supporting keys V which are numbered from 0 to 9. The lever 2 of a total key U also extends through the front of the casing, and above the latter are standards 4, 4, supporting a reel 3 for the paper to be printed. There may also be another lever 133 for a repeater key Y.

At the right of the casing is a hand lever W and a zero lever X, and at the left of the case is a restoring lever C. At the rear of the frame is a series of wheels of the adder or accumulator D, (Fig. 8), and near the front the series of sectors of the recorder R, Fig. 7. In the front of the casing opposite the adder wheels is a slot $q$, Fig. 8, through which can be seen the numbers of the adder wheels, in line with each other, indicating the number set up on the wheels.

*The adder.*—The adder wheels $b$ turn separately on a shaft $d$ supported between the side plates of the frame (Fig. 2), and each has at its periphery teeth numbered in series (five series being shown) from 0 to 9, Fig. 23. With the adder wheels coöperates a series of oscillating alining segments 78, each of which has ten teeth or shoulders and carries a pawl 88 (Figs. 9 and 17) that engages the toothed periphery of the adder wheel on the right, when the segment swings in the direction of the arrow, Figs. 9 and 17. The extent of oscillation of each segment determines the extent of rotation of the coöperating adder wheel, and the segments are oscillated in the direction of the arrow by means of a selector F. This selector consists of a curved frame carrying series of radially adjustable U-shaped pins 74, said selector frame sliding on the cross rods 6, 6 of a frame E swinging on the shaft $d$ (Fig. 2) and consisting of side pieces $e$, $e$, said cross rods 6, 6 and cross bars 75, 76, Figs. 2, 10 and 11.

Prior to operating the keys, the frame E occupies its lower position, Figs. 2, 10, and the selector is at the right of the machine with the inner row of pins above a series of hammers 72, Figs. 2, 8 and 17, at the rear ends of the key levers 1, and in a plane parallel to that of the series of pins.

When a key is depressed, its hammer 72 will rise and push in one of the pins, and on the descent of the key lever the selector will move one step to the left, bringing the inner series of pins, including that raised, beneath the segment at the right. The frame E is then swung to the position shown in Fig. 11, the pin which has been set inward making contact with a shoulder of the segment, Fig. 17, and the latter being swung with its adder wheel to an extent depending on the distance before starting, of the pin from the shoulder 89 of the segment, Fig. 17.

The hammers 72 are so arranged that the hammer nearest the rear is carried by the lever of the key having the highest number and so on in succession, the hammer nearest the front being carried by the key bearing the cipher. It therefore follows that the depressing of the key numbered 9 will carry the segment to its full extent, while depressing the key bearing a cipher will impart no movement to the segment until the pin at the extreme left, Fig. 17, makes contact with the shoulder 89, when the segment and its adder wheel will move one step.

Each segment is connected with one of the printing sectors 100 of the recorder R by a connecting rod 118, said sector swinging on a cross shaft 116 and being moved the same number of steps as the segment.

Any row of pins above the hammers 72 is under the control of all the numeral keys, and after one key is struck and released and the selector moves inward one step, the next row of pins is brought above the row of hammers 72 and one of the hammers of this second row may be pushed inward by the operation of any numeral key, and on its release the selector will move inward another step, and so on until keys corresponding to the number to be added are struck. Then the frame E with the selector is swung to the position shown in Fig. 11 and segments and adder wheels corresponding to the number of keys struck are actuated by the selector, the selector then sliding back to the right and the frame E then swinging down to its first position. A pin 90, Figs. 2 and 8, projects inward from one of the side frames through an opening in the frame E and carries a rolling sleeve. The roller pin extends across the selector when the latter is in position at the right of the machine and clear of the adder wheels. As the selector moves step by step inward, each row in which a pin has been elevated is carried beyond the end of the pin 90, so that said selector pins do not contact therewith when the frame E is swung upward. But after the selector has been elevated, and is then carried to the right, and begins to swing down, the inner ends of the adjusted pins make contact with the pin 90 and are pushed outward, a result which is facilitated by beveling the inner ends of the pins as shown.

As there are five series of numbers on each adder wheel, the latter is turned one fifth of a revolution at each full movement of its selector, but always in the same direction.

*The carrying mechanism.*—While any suitable means may be employed for moving each adder wheel one step as the wheel next below is moved in excess of nine steps, I prefer the means shown in the drawing, especially in Figs. 10 and 11, and which I will now describe.

The backward rotation of each adder wheel is prevented by a pawl 104, hung to a cross shaft 102 supported by a bracket 105 and the side frame at the left, and having an end lug engaging the toothed periphery of said wheel under the action of a spring 113 connected to the tail of the pawl and to a detent 106 hereinafter described.

Upon the shaft 102 are hung curved levers 101, one adjacent to each adder wheel, with its front end beveled to engage and be elevated by pins k at the side of the adder wheel, one to each series of digits thereon, there being one of said pins in position to strike the lever 101 as the adder wheel is moved beyond the ninth tooth of each series. To the forward end of each lever 101 is pivoted a hook 103 having a beveled end which rests normally on a fixed cross rod 111 supported by the bracket 105 supporting said end in a position above and out of contact with the periphery of the next higher adder wheel. Each lever 101 is actuated in part by a motor consisting of a spring 114 and a cam arm 108, to which and the detent 106 the spring is connected, said cam arm swinging on a cross shaft 109 and having a beveled cam edge 110 which may bear on a roller pin 112 at the side of the lever 101 to depress the rear end of the latter. When the said end of the lever 101 is raised, its pin 112 enters a notch in the cam arm, which then retains it in its elevated position. The rear end of the lever 101 is then above the cross rod 75 of the frame E, Fig. 10.

On the lever 101 is a lug 129 which, in the position shown in Fig. 10, engages a shoulder r of the detent 106 hung to a cross shaft 107, and the lower end of the detent is in a position to be struck by the cross bar 75 of the frame E when the latter swings to the position shown in Fig. 11.

So long as the end of a lever 101 is not struck by a pin k there is no carrying from one adder wheel to another, but when such pin makes contact with the forward end of a lever 101, it lifts the latter and carries its pin 112 forcibly out of the notch in the cam arm 108 and down until the cam edge 110 bears thereon, but any further movement is limited by the contact of the lug 129 with the shoulder r of the detent 106. In this position, the hook 103 is carried forward to such an extent that its hooked end is just above but out of contact with the periphery of the adder wheel below. As the frame E reaches the position, Fig. 11, the cross rod 75 makes contact with the detent 106 and swings the latter forward carrying the shoulder r from above the pin 129, when the cam edge of the arm 108 bearing on the pin 112 under the action of the spring 114 will force down the rear end of the lever 101, carrying forward the hook 103 and bringing it into engagement with a tooth of the adder wheel beneath, turning the latter one step. This action results of course with each wheel where a pin k of the next lower wheel has shifted the lever 101 to carry its pin 112 out of the notch of its cam lever. As the frame E swings back, the cross bar 75 passes beneath and lifts all the levers 101 that have been operated, brings their pins 112 into the notches of the cam levers and restores the parts to the position shown in Fig. 10.

It will be seen that the action of the pins k and adjuncts is to set the parts for action in carrying, but that the actual carrying movements are effected by the spring motors when the detents 106 are shifted after the adder wheels are set by the action of the selector.

*Zero device.*—To carry the wheels to zero after any one or more have been moved one or more steps, I make use of a device on the frame E which will make successive contact with the pins k of the wheels which have been put out of position and this device will then turn all the wheels as the frame swings upward, the same members on the wheels being in alinement and the segments being stationary. Thus the frame E carries a shaft 94 rocking in bearings of the frame with fingers 98 extending between the adder wheels in position (after the shaft 94 is rocked in the direction of its arrow, Fig. 11) to make contact with the pins k. When therefore after thus setting the shaft 94 and pins the frame E is swung upward, the top pins of all the wheels that are moved one or more steps will be met by said fingers and the pins k (and consequently corresponding figures on the wheels) will be brought into line. As shown in dotted lines r², Fig. 11, the first of the fingers 98 is set in advance of the others so that it will strike the pin k of the first wheel and turn the latter one step ahead of the others. As the fingers bring all the 9's of the wheels into alinement the added extent of movement secured by the forward position of the first finger carries the coacting first wheel one step forward and the cipher of that wheel is alined with the row of 9's of the other wheels. As this movement of the first wheel takes place it carries one to the next wheel (already turned 9 steps) by the devices already described, and as the second wheel turns to zero it adds one step to the third wheel and so on all the wheels in succession being turned back one step and the zeros thus are brought into line.

The totalizing shaft 94 is set by the zero lever X on a shaft rocking in the right side piece of the main frame, and as the frame E which carries the shaft 94, moves in respect to the main frame, it is necessary to provide transfer means between the shaft and zero lever permitting such movement. This means may be of different characters; as shown the shaft 94 carries at the outer end an arm 93, Figs. 8, 10 and 11, which when the parts are in the position shown in Fig. 8, extends over an arm 92 carried by the shaft 410 of the lever X, so that when the latter is swung in the direction of its arrow, Fig. 8, the arm 93 will be raised and the shaft 94 rocked. A spring 5, Fig. 2, tends to rock the shaft 94 in a direction to keep the arm 93 in contact with the arm 92, and as the bearing of the arm 93 on the arm 92 is near the center of rotation of the frame E, the shaft 94 is prevented from rocking to carry its fingers out of position until they have contacted properly with all the pins k. As the frame E approaches the position shown in Fig. 11, the arm 93 passes from contact with the arm 92 and bears on a pin 7, and is held in a position to slide over the arm 92 when the frame E rocks back.

*Correcting device.*—After striking a key or keys and an error is found before recording, correction may be made by pushing out the pins that have been set inward. As the selector moves under the adder when a pin is pushed in, the restoring device must move between the adder wheels and the selector, and I therefore hang a bail T, Figs. 15 and 16, to the shaft d having a thin cross blade 8 with a bevel edge, which, as the bail swings in the direction of the arrow, Fig. 15, meets the beveled ends of the pins and pushes them out. The bail may be swung from the restoring lever C in different ways. As shown, the shaft of said lever extends through the frame and carries an arm 9 to which is pivoted a curved and slotted link 10, into the slot of which projects a pin 11 from the side of the bail. In the ordinary movements of the frame E, the pin 11 traverses the slot in the link, but when the restoring lever C is shifted, it carries the bail with it over and depresses the pins. See dotted lines, Fig. 15.

*The recorder.*—As shown the recorder is a printer in which the series of printing type carriers of any suitable character, which as shown are sectors 100, move each with the segment to which it is connected. It will be evident that as each segment moves the number of steps corresponding to the number on the key depressed, the annexed recording type carrier will be moved to a like extent, as will also each adder wheel, but the latter will always rotate in one direction while the sectors oscillate.

With the type carriers, Figs. 9 and 24, is combined a platen and feed roll n, Figs. 7 and 9, on a shaft carrying a knob 306, Figs. 1 and 13, at one end, by which to turn it to feed the paper strip between the roll n and pressure bands 19 carried by suitable guide rolls, all supported on a frame S swinging on a cross shaft 131.

To secure a quick sharp blow of the platen against the type, it is carried forward by a spring 126 connected to the frame S and the latter is retracted by rotating cams 42 on a shaft 41, said cams bearing on the lower ends of the side bars of the frame S with shoulders which pass suddenly from the frame, and with faces s which thereafter make contact with the frame and cause the platen to be carried back against the force of the spring.

The paper is moved at each back movement of the frame S by a pawl 212 pivoted at its lower end to the main frame and engaging a ratchet wheel 20 on the shaft of the platen, a pawl 21 carried by the frame S also engaging the ratchet wheel and preventing back rotation. A spring 22 bears on the pawl 212.

*Total indicator.*—After a column of numbers has been recorded, the total is printed, and to enable the total to be distinguished from the other numbers of the column, I provide a line bar Q, Figs. 3, 7, and 19, which, whenever a total is to be printed is swung between the type carriers and the platen, and preferably by the action of the total key. As shown, this bar is a part of a wire bail 225 supported by a swinging frame 200 operated as hereinafter described, so that the line is printed above the total.

*The ribbon support and feed.*—While any suitable impression means may be used, I show a ribbon a, Figs. 3, 9, 24 and 25, carried by two spools upon inclined spindles 25 and each inclosed by a circular casing 26 slit at one side for the passage of the ribbon from one spool to the other. The spool spindles rotate in brackets of the frame and each has at the lower end a ratchet wheel 27 with which may engage a spur 30 of a swinging pawl 29 pivoted to the adjacent bracket, the teeth of the ratchets being reversed and means being employed to throw out one pawl as the other is thrown into engagement with its wheel. Spring pawls 28 secured to the brackets prevent back rotation when the pawls are in action. Each pawl 29 is recessed at the lower end to receive the shaft 23 which has collars 227 on the outer sides of the pawls 29. By moving the shaft 23 longitudinally, the pawls can be swung away from one ratchet wheel, the other pawls being carried into engagement with the other wheel. To permit the proper lateral play of the pawls, their lower ends are extended between the collars 227, and disks 231 free on the shaft 23, which are pressed toward the collar by an intermediate spring 32. As the frame S swings forward the operative pawl engages and turns its wheel.

The shaft 23 is set by hand and has two grooves p p, Fig. 25, near each end, and passes through an opening larger than the shaft in the side piece of the frame S, and when in either position it is held with the edge of the opening in the groove by the pressure of the spring 22, Fig. 9. The sides of the grooves p are beveled so that the shaft can be readily pushed longitudinally to change its position and reverse the directions of feed.

*The totalizing means.*—In order to take the total it is necessary to swing each type carrier a number of steps corresponding to the number of steps imparted to the associated wheel b during the preceding adding. As the type carriers are all swung to zero after each record, and as in taking the total the number keys and selector do not operate to move the segments, other means are required to effect the movement of each segment equal to the number of steps that have been imparted to the associated number wheel. This movement of the segments is effected by turning all of the adding wheels a complete movement (that is, one-fifth of a rotation) bringing their pins k into contact with parts on the segments. As in adding each of these pins has been carried forward a number of steps equal to the number of steps imparted to the adder wheel, each pin will have advanced a corresponding number of steps toward the contacting part of the segment, and on striking the latter, the segment and the connected sector will be moved to a corresponding extent. Of course, this movement of the pins k from the position in which they have been set in turning the adder wheels in adding might be effected by different means, but the adder wheels themselves are turned together one-fifth of a revolution as a means of turning the segments from the wheels.

As shown, each segment is provided with a contacting device with which the pins of the adjacent lower wheel may make contact, the said contacting device being a bent dog 357 pivoted by a pin 358 to the side of the segment, which dog may be swung to a position for its tail to be struck by the adjacent pin $k$ of the number wheel. If, for instance, a number wheel has in adding been turned eight steps so that the figure 8 will represent the total number added on the wheel, the pin $k$ will be two steps from the tail of the dog, and after the wheel is turned the extent of two steps, the pin $k$ will contact with the tail of the dog and the segment will then be carried with the wheel eight steps as the wheel completes its one-fifth of a revolution, carrying the connected sector eight steps.

If, in adding, a number wheel has been turned ten steps, it is not necessary then to turn the segment from the wheel. I therefore provide a slip connection between the dog and the means for setting it so that when a total is to be taken, when the adder wheel has completed one-fifth of a revolution, the pin $k$ will be beneath the tail of the dog 357, which, instead of being set down into a position to be struck by the pin, will normally be brought on top of the latter, see Fig. 23, and the pin will pass beneath the dog without moving the segment. Thus, alongside of the dog is an arm 356 the dog having a lip 303 which bears with a spring pressure on the arm so that normally they will swing together, but if the dog rests on the pin $k$, as in Fig. 23, the arm can move independently. With this arm coöperate the means for setting the dog. Thus each arm has at the upper end a notch $i$ with a V-shaped mouth to receive a lug 300 on an arm 301 projecting from a bail L pivoted at $V^5$, Fig. 19 to the frame E and having a cross bar 345, which when the bail is swung inward, will engage the teeth of the adder wheels binding them all together so as to turn with the frame E, while at the same time setting the arms 356 and swinging with them such of their dogs as can be moved into operative position to be struck by the pins $k$. When any one of the number wheels is in a position to expose and cause the printing of a cipher the pin $k$ thereof will be under the tail of the dog 357, as in Fig. 23, which is thus prevented from swinging downward, and in such case the coacting segment will not be moved.

The bail L is swung by the action of the total key U through any suitable connections. As shown (Fig. 19) the key U is connected by a link 179 to the end of a cross bar 180 on a rock shaft 304, an arm 305 of which is connected by a link 329 to an arm 340, dotted lines, Fig. 21 and Fig. 22, on a rock shaft 370 extending through the side of the main frame and carrying at its inner end a cam 341.

The bail L has an arm 345$^a$ which extends outward across the side of the frame E to the outside thereof and over the edge of the cam 341. A shoulder $f$ of the cam, when the latter is rocked in the direction of its arrow, Fig. 21, by the total key bears on the arm 345$^a$ and swings in the lower end of the bail to lock the wheels $b$ together. When this takes place, the arm 345 passes into a notch in an L-shaped latch 347 pivoted to the side of and carried by the rock frame E, a double spring 348 lifting the long arm of the pawl, which locks the bail L so that it cannot move until the total printing is fully effected. At the end of the forward movement the end $v^7$ of the latch 347 strikes and is swung by a stud 350 (dotted lines, Figs. 8 and 21) on the frame of the machine and the bail is thus released and swings from the adder wheels so that the frame E can swing back. If the total key should, accidentally, be held depressed during the back movement of the frame E the cam 341 would strike the arm 345$^a$ and bend or break the parts. To prevent this a lever 349 is pivoted to the side of the cam and as the frame E swings down a stud 350 thereon strikes the tail of this lever and swings it, the short arm of the lever bearing on this shaft 370 and swings the cam to carry its forward part down out of position to contact with the arm 345$^a$. The depressing of the total key also sets in place the total line bar Q as the bar 180 (Fig. 19) is connected by a link 181 to a frame 200 which carries the said line bar.

To the cam 341 is pivoted by a pin 352, Fig. 21, one end of a link 307 which is pivoted at the other or front end at 8 Fig. 19 to a bail 308 Fig. 23 pivoted at 309 to each side of the main frame and carrying a series of overlapping pawls 310, one to each segment, and above the links 18 thereof, and opposite an upwardly projecting tail 311 of said segment, which tail has at its outer edge a shoulder $h$.

If in printing a total the type carriers were in printing position when at zero, a row of ciphers might be printed in front of any number printed and I therefore so arrange the parts that the type-carriers when the adder wheels are at zero have the ciphers one step below printing position. It is therefore necessary to impart movement of one step to each type carrier to bring it to position to print a cipher, and I provide means whereby this movement is given only to the segments which coöperate with the wheels on which a number has accumulated while the segments of superior order are not so moved. This movement to print ciphers at the right is effected by the series of overlapping pawls 310 each adapted when the bail 308 is swung rearward to engage the shoulder $h$ of the tail 311 on the opposite segment.

When, therefore, a type wheel is turned (as all turn together in recording a total) and a segment swings down, its tail carries down the co-acting pawl 310 and the latter depresses the other pawl, and all below, which pawls bear on the connecting links 18 below them and carries the links down sufficiently to turn segment jointed thereto each one step, and therefore shift the type carriers one step and to position to print ciphers at the right.

To prevent action of the motor arms 108 when the wheels $b$ are locked together in printing totals, an arm 312 is pivoted to the side of the main frame and bears on the pin 352 Fig. 21 of the cam 341 under the stress of a spring 405, Fig. 23, so that its upper end is thrown back when the cam is rocked. This upper end carries a cross bar 314 which is forward of the upper ends of the motor arms 108 Fig. 19 and which is brought against them to hold them out of action when the cam 341 is rocked.

The adding and recording mechanism thus described may be combined with different forms of actuating mechanism, and I will now describe the construction and operation of that shown and which has proved effective.

*The actuating devices.*—The actuating devices consist of a motor M which when released actuates the parts and the hand lever W which stores the power in the motor and releases the same at each operation, and the keys and key levers.

*The motor.*—As shown, the motor is a spring motor consisting of a coiled spring 36 (Fig. 14) in a casing 34, turning intermittently in the direction of the arrow, Fig. 8, one complete revolution at a time about a normally stationary sleeve 50 on a shaft 31 and to which sleeve one end of the spring is secured, the other end being attached to the casing.

Upon depressing a key a pin is raised thereby and when the key is released, the selector is carried by the motor one step to the left. The motor acts on the selector through a lever K, Figs. 4 and 5, pivoted to a stud 51, and which moves one step as each key rises. The lever K is connected with the frame of the selector through the medium of a frame Z, Fig. 2, sliding on cross rods 53, 53 of the main frame, having a stud 54 extending between fingers at the end of the lever K, and an arm 55 on the frame Z having a slit or groove (Fig. 2) receiving a curved plate 56 Figs. 2, 15 and 16 of the selector, so that the latter can swing in respect to the arm 55, but must travel with it and with the frame Z.

The step by step motion of the lever K takes place when the keys are operated and is controlled by an escapement N of suitable character, Figs. 4, 5 and 18. The return of the lever K is directly by one movement. As shown, there are two dogs 12, 13, each with a tooth adapted to engage a curved rack 57 at the forward end of the lever K. The toothed end of the dog 13 is carried toward the rack and the toothed end of the dog 12 is carried from the rack, each by a spring 14, and links 15, 16 connect the dogs with arms 63 of a rock frame H, Figs. 7 and 18, carrying a bar 64 which extends below all the key levers. When a key lever is depressed the frame H is rocked and the inner end of the dog 13 is swung forward and releases the lever K, and the tooth of the dog 12 enters a notch of the rack 57. When the key lever rises, the frame H, by the action of the spring 14, is rocked in the other direction, the dog 12 is withdrawn from the rack, which moves one step, and the tooth of the dog 13 enters the first notch and arrests the further movement, and so on, at each oscillation of the frame H.

The motor moves the lever K in the direction of its arrow, Fig. 4, as the lever is released by the escapement, by acting on a T-lever P which also swings on the stud 51, and which, during the setting of the selector by the keys is locked by a suitable locking device G to the lever K so that both levers move together.

The lever P has at each end a fork 70, the fingers of which are bent downward and receive between them pins 40 projecting inward from mutilated disks 38, 39 on the shaft 41 which is turned intermittently from the motor through a "Geneva stop," Fig. 12. Thus the disk 39 on the shaft 41 has radial slots to receive pins 37 projecting from the motor casing opposite the cut away portion of a mutilated disk 58 at the inner side of said casing, and at each complete rotation of the motor casing from and to the position shown in Fig. 12, the shaft 41 is turned one half a revolution. The pins 40 on the disk 39 are on a plane passing through the axis of the shaft 41 at right angles to that occupied by the pins 40 of the disk 38, and as one pin of the disk 39 passes down between the forks at one end of the lever P and rocks the latter in one direction, the pin 40 of the disk 38 is carried to a position above the other forks and then passes down between the prongs and oscillates the lever P in the opposite direction.

During the step by step movement of the lever K controlled by the escapement, said lever is locked to the lever P by the lock G, and the motor M acts simply to apply such a pressure to the lever P as will carry the levers and selector and connections one step at each operation of the escapement N. After the required numeral keys have been struck and the selector is shifted laterally to proper position, the shaft 41 must continue its rotation as the frame E is rocked, and as no further lateral movement is to be imparted to the selector, the lever P which moves with the shaft 41 must be unlocked from the lever K. During the movements of the frame E, the lever P therefore swings first from the lever K, leaving it and the selector in the positions to which they were set, after which the continued rotation of the shaft 41, in completing its rotation, swings the lever P back, bringing a stud 67 against the lever K and carrying the latter and the selector back to their first position. The motor therefore moves the levers K, P in both directions but the lever P moves with the lever K only step by step under the releasing action of the keys, the further movement of the lever P away from the lever K and back to and with the latter, taking place during the movements of the motor in operating the other parts of the machine, except in operating with the repeat key.

The next movement after all the keys required to indicate a number are operated, is the rocking upward of the frame E to the position shown in Fig. 11. This is effected by the engagement of the stud 238 of the motor casing (Fig. 12) with the hook at the lower end of a pawl 80 which is pivoted at the upper end to a stud 79 at the side of the frame E forward of its shaft (Fig. 8 and dotted lines Fig. 12), and the pawl is carried down to the position shown in Fig. 9 until the stud 238 passes from contact therewith. The continued rotation of the motor casing then brings the stud 238 against a lug 85 of a second pawl 84, also hung to the stud 79, and said pawl is raised, thereby swinging back the frame E until it reaches the limit of its movement, the parts then being in the position shown in Fig. 12.

It is during the time that the stud 238 is passing from the pawl 80 to the pawl 84, after the adder wheels and adjuncts have been actuated, that the lever P is carried back to the lever K and both with the selector moved to their normal position, the Geneva stop securing the proper movements of the shaft 41 and the proper intervals of rest between the movements. The required swinging movements of the pawls 80, 84 to bring them into position to be met by the stud 238 is secured by a properly shaped cam plate 86, Figs. 12 and 13, secured to the side frame and against the opposite edges of which lugs 82, 83 on the pawls are caused to bear by a spring 87 coiled around the stud 79 and bearing on the pawls and swinging each toward the cam plate. The cam plate also acts to secure the locking of the oscillating frame E in each position by the lug 82, swinging over the top edge of the cam plate when the frame is forward and the lug 83 on the reverse position swings under the lower edge of the cam plate.

After the levers P K and selector have been moved to normal position and the frame E is swung back, the parts are held at rest by locking the lever P to the lever K which is held stationary by the dog 13, and it is only on pulling forward the hand lever W, after the keys are set, that the lever P is unlocked and the motor put into action on the other parts of the apparatus. The shifting of the lock G by the action of the hand lever may be effected by different means. As shown, the hand lever is secured to the shaft 31 carrying a bevel pinion 140 which gears with a curved rack 141 on a rack plate g, pivoted to a stud 225, one edge of which, as the plate begins to move in the direction of the arrow, Fig. 4, is brought against a part of the latch of the lock and shifts the same. As shown, (see Figs. 4, 5, 6 and 18) the latch is a plate 142 with openings having inclined edges resting on studs 143, 143, projecting from ears 144, 144 on the lever K. A lip 145 of the latch plate extends downward opposite the forward edge of the rack plate g, and another lip 146, when the lever P is in the position shown in Fig. 4, enters a notch y (Fig. 5) in said lever, being held therein by the action of one limb of a bent spring 147, the other limb bearing on and tending to force down the latch plate. Owing to the inclines on the latch plate, pressure on the rear edge of the lip 145 by the plate g carries the latch forward and also raises it and carries the lip 145 above the plate g which can then continue its motion, and the lip 146 is also carried from the notch y releasing the lever P. On the return motion of the lever P, beveled lugs 148, 149 (Fig. 5) thereof pass under and lift the latch until the notch y receives the same and the parts are again locked together.

While the power may be stored in the motor in different ways, I prefer to wind up the spring at each movement of the operating handle. This is effected as shown by providing the rack plate g with a second rack 150, Figs. 4 and 5, which engages a pinion 151 turning on the shaft 31, Figs. 4, 13, 14, 18, and provided with a spring actuated bolt 152, which, when the pinion is turned in the direction of its arrow, Figs. 4 and 13, engages the shoulder of a notch t in the sleeve 50 and turns the latter to wind up the spring, but on the reverse movement of the pinion, the bolt is pushed in by an inclined face of the notch and the sleeve 50 is not turned. The sleeve 50 turns one complete rotation at each forward swing of the rack plate g and is then held from reverse rotation by a stop device engaging a disk 153 (Fig. 14) secured to the sleeve. This stop device consists of a wedge 182 (Figs.

14 and 28) which permits the disk 153 to turn in the direction of the arrow, Fig. 28, but is carried by a spring 183 so as to wedge between the disk and a roller 184 on a stud on the main frame, and prevent rotation of the disk in the opposite direction.

The movement to wind up the spring results when the hand lever W is drawn forward and during the entire forward movement of the lever and of the rack plate and while the motor is acting upon the other parts of the machine, the pinion 151 being turned backward on the return motion of the hand lever and rack plate. A spring 18 (Figs. 5 and 8) coiled around the stud 51 bears on the lever P and tends to aid in carrying the latter with the lever K in the direction of the arrow when the keys are depressed.

*The governor.*—The speed of the motor is controlled by a suitable governor J. As shown, a spindle 154, Figs. 2, 4, 13, supports a sliding friction disk 155, which is carried with more or less force against a forked plate 156 by the outward swing of balls 157 on spring bars 158 attached to the disk and at their inner ends to the spindle. The latter is driven from the motor casing by gears 159, 160, 161, 162. The forked plate 156 is secured to and adjustable on a stud 163 to vary the governing action.

*Full motion device.*—It is important after the hand lever and connected parts begin a movement that this movement shall be completed before the hand lever is reversed. To this end, I use a double pawl 164, Fig. 12, centrally pivoted to a bracket on the base plate of the machine and the ends of which may alternately engage a curved rack 165 at the underside of the rack plate *g*. The end of the spring 166 engages one or other of two notches at the lower part of the pawl, said notches separated by a V-shaped projection so that a force applied to tilt the pawl will bring one side or other of the said projection against and depress the end of the spring and cause it to enter the other notch and hold the pawl in the position to which it is thus set. At the under side of the plate *g* is a lug 167 so placed that as the plate *g* completes its movement in either direction, it will bear on and reverse the position of the pawl.

Normally, the pawl is in the position shown in Fig. 12, and the forward end uppermost to engage the rack 165 and permitting the forward but preventing any back movement of the plate. As the forward movement is completed, the lug 167 depresses the forward end of the pawl when the plate *g* can be moved back, but is prevented from moving forward until the back movement is completed, when the contact of the lug 167 will tilt the pawl to the position shown in Fig. 12.

*Locking devices.*—When one part of the machine, as a numeral key, total key, the hand lever, etc., is being operated no other part should be moved, and to prevent such conflict of movements as well as to insure movements in proper order, I employ locking devices which I will now describe. When a numeral key is depressed, it rocks the frame H and the arm 63 thereof (Figs. 7, 18) is brought opposite the end of a bent lever 62 connected by a link 60 with the rack plate *g*, so that both the latter and all its connected parts are prevented from movement until the key rises. In like manner, on the beginning of movement of the hand lever and rack plate *g*, the lever 62 is swung forward in position back of the arm 63, so that the frame H cannot swing nor any numeral key be depressed until the plate *g* and hand lever are back in position.

On the lever 62 is a finger 66, Figs. 7 and 18, and as the lever completes its forward motion, when the plate *g* swings forward, the projecting edge of the mutilated disk 38 on the shaft 41 is brought opposite the end of the finger and prevents a return swing of the lever 62 and locks the keys and connections in place until the parts operated by the motor complete their movements.

To prevent movement of the type carriers while printing, a movable bar 124 (Figs. 10 and 11) is carried upward to engage the notches at the peripheries of the segments 78 after the latter and their connected type carriers have been set, to thereby hold both in place until the bar is withdrawn. Any suitable means may be employed for actuating said bar. As shown, it is carried by arms 123 pivoted to the frame E, and the arm 123 at the left of the frame (as the latter reaches the position shown in Fig. 11, setting all the quadrants) is brought against a fixed roller stop 125 of the frame and swung up to carry the bar 124 into engagement with and hold the segments.

To carry the platen away from the type carriers after making a record and to then prevent its movement toward the type carriers until after they are again set, a stud 122 (Fig. 9) on the frame E acts on suitable connections with the platen frame S as the frame E assumes its normal position. As shown, a hooked lever 119 is pivoted to the main frame and is connected to the platen frame S by a link 121, and as the frame E swings to the position shown in Fig. 8, the stud 122 engages the hooked end of the lever 119 and swings the latter so as to swing the frame S and carry and hold the platen away from the type carriers.

After the type carriers are set for printing and as the frame E approaches the position shown in Fig. 9, the stud 122 swings the lever 119 to carry the link 121 to the right, but as the frame S is then in contact with the raised parts of the cams 42 and should not move until the recessed parts of the cams are brought opposite the frame, the link 121 is not connected positively with the frame S but is slotted to receive a pin 132, and the spring 126 is connected to said pin and to the lever 119 and tends to hold the parts in proper relation but yields to permit the lever 119 to swing to a limited extent independently of the frame S and swings the latter to carry the platen to the type carriers 100 when the cams 42 turn to proper positions.

To lock the total key and zero keys, each by the setting of the other, there is a flat bar 170, Figs. 3, 10, 11, 17 and 19, which rocks in the side plates of the main frame, and at one end thereof is an arm 95 slotted to receive a pin 97 on the arm 92 (Figs. 8, 10 and 11) which is swung to the position shown in Fig. 10, by operating the zero handle X when the adder wheels are to be set to zero. This lifts the rear end of the arm 95 and so sets the bar 170 that the shoulder of the link 307 will strike the bar preventing the forward movement of the link and of the bail 308 connected with the total key, which is thus locked. In like manner when the bail 308 and link are carried forward by depressing the total key, the bar 170 cannot be rocked and the zero lever is thus prevented from swinging forward. The zero lever is locked after being swung forward by a hooked pawl 401, Fig. 8, the hook of which enters a notch at the end of the arm 95. When the frame E swings up, the end of the shaft 94 strikes the end of the arm of the pawl 401 and swings it to release the arm 95.

To prevent the movement of the key levers after the zero lever is shifted, an arm 171 extending from the rock bar 170, Fig. 15, carries a link 172 which engages a shoulder 173 on a slide 174 and carries the latter backward to bring a projection 175 thereof above an arm 176 (Figs. 7 and 15) of the frame H, which cannot then be rocked.

The total key U is prevented from being operated after a number key is depressed by a latch 177, Figs. 19 and 20, pivoted to a cross bar of the frame and with a lip m extending down opposite the edge of the lever K (Fig. 20), so that the first movement of the lever K lifts one end of the latch and carries its upper end beneath the lever 2 of the total key.

It will be seen that as the platen is placed back of the recording wheels but at the front of the machine, the record upon the paper carried by the platen is always visible to the operator after printing.

To prevent back movement of the operating handle W before the adding mechanism has completed its operations, a dog 317, Fig. 18, is pivoted to the link 60 to engage a stud 318 on the base. This engagement occurs when the rack plate g is in its rear position, and is maintained until the shaft 41 has turned sufficiently to bring the recessed part of the disk 38 opposite the finger 66 when the lever 62 will swing backward and by contact with the front end of the dog raise the rearward end free from the stud. To permit the swinging forward of the arm 62, it has a pin 319 which enters an elongated opening or slot 320 in the link 60.

*Repeater key.*—It is advisable in some instances to repeat either a number or a total and I therefore provide a repeater key Y, Fig. 1, and connections, which, when the key is depressed will hold the parts in their position and permit the handle W to be operated to bring the platen toward the type carriers to operate them any desired number of times in succession. The said means consists of devices for holding the frame Z, while permitting the movement of the levers K, P when the handle is operated as is required in order that the frames E and S may be swung. As shown, the key Y is upon a key lever 133 at the side of which is a slot receiving a pin 321, Figs. 4 and 7, extending from a bell crank lever 322 pivoted to the side frame and the tail of which is brought in contact with the end of the dog 13 to swing the latter to release the lever K when the key Y is depressed. The key lever 113 is pivoted to the cross bar 61 upon which the other key levers are pivoted and at the rearward end is slotted to receive a pin 323, Fig. 8, on the side of a crank lever 324 pivoted to the cross bar 53, and at the lower end of the lever 324 and of an arm 325 (Fig. 4) pivoted at the other side of the machine is supported a notched plate 326, the notches of which will receive the stud 24 in any position which the frame Z may take at the time that a number is to be repeated. When the plate 326 swings forward it makes contact with a dog 327, Figs. 4 and 5, pivoted to the end of the lever K and carrying one of the fingers between which the stud 54 of the frame Z extends, and carries said finger out of position so that the lever K may move without interference in one direction, without moving the frame Z, a spring 328 swinging forward the dog 327 when the plate 326 swings forward. The end of the dog is beveled so that when brought in contact with the stud 54, the dog will swing back and permit the stud to enter between the fingers. It will be seen that so long as the key Y is depressed, the handle W may be thrown forward and released to duplicate the printing of a number to any required extent.

On the left hand side frame is a stop 330, Fig. 4, in such position as to limit the movement of the rack lever k when liberated from connection with the frame Z, permitting it to complete its swinging movement while the other parts remain stationary.

It will be seen that by the above described combination of parts the type carriers are operated from the oscillating parts or segments which oscillate to secure each record while the number wheels have an independent rotary motion in one direction and that therefore it is possible to operate upon the adding wheels and to secure the desired operations in carrying independently of the movements of the parts connected with the type carriers, and the said parts may be arrested to secure the desired interval of rest for printing regardless of the operations of the adder wheels themselves and the printing is effected before the selector and its other parts are returned to position. It will also be seen that the segments in adding actuate the adder wheels carrying them to their required positions while in taking the total the adder wheels are the means of setting the segments and their associated type carriers.

It will be evident that the adding wheels may have any number of series of figures and that the intermediate operating segments may be differently constructed from the construction shown and be provided with different means for moving the adder wheels therefrom, and also that the type carriers instead of being in the form of rocking sectors as shown may be constructed in other ways so as to carry the type to different positions according to the movements of the segments.

Without limiting myself to the precise construction and arrangement of parts shown, I claim as my invention:

1. In an adding mechanism, a series of rotatable adder wheels, intermediate segments, a printing device arranged forward of the segments, link connections between the segments and printing device, means for oscillating the segments, and means for turning the adder wheels in one direction by the oscillation of the segments, substantially as set forth.

2. The combination with the laterally sliding frame carrying parallel series of pins, of a series of keys arranged side by side and key levers converging toward the rear and terminating in hammers arranged in a line at right angles to the line of keys and parallel to those in which said pins are arranged, substantially as set forth.

3. The combination with the laterally sliding selector having parallel series movable pins, each series in one vertical plane, of a series of hammers all in the same plane, and a series of converging levers each carrying one of said hammers at one end and a key at the other, the said keys being in a line at right angles to the said planes, substantially as set forth.

4. The combination with the selector, pins, and means for setting inward the pins thereof, of a restorer having a cross blade, and means for carrying said blade over and setting out the pins, substantially as set forth.

5. The combination with the selector, movable pins, and means for setting inward the pins thereof, of a restorer having a cross blade, means for carrying said blade over and setting out the pins, and a handle for operating said means, substantially as set forth.

6. The combination with the adder wheels, of segments provided with means for engaging and turning the wheels in one direction while permitting the segments to move independently in the reverse direction, keys, means for turning the segments and wheels to an extent depending on the key struck, a type carrier, and a link between each type carrier and each segment, substantially as set forth.

7. The combination with the keys, adder wheels and connections whereby the number of adder wheels operated counting from that indicating the lowest column corresponds to the number of keys depressed, of a sight opening, and numbered plate and means for shifting it to bring opposite the sight opening the number indicating the column containing the highest number added, substantially as set forth.

8. The combination in an adding machine, of the printing device at the front of the machine, and a platen arranged at the rear of the printing device and above the latter and automatic means for carrying paper and the platen, to and from the printing device so that the print can be seen by the operator, substantially as set forth.

9. The combination with the type carriers and adder wheels arranged in separate positions, of wheel operating segments intermediate and alternating with the said adder wheels, and connections between the segments and the carriers, and means for locking the segments while printing.

10. In an adding machine, a series of adding wheels of different numerical orders, a series of type carriers of corresponding numerical orders arranged at a different part of the machine, link connections between the two, wheel rotating mechanism independent of said connections and movable about the axis of the wheels, key-actuated means governing the selecting and rotation of the adding wheels, and means operated by said wheel rotating mechanism to set the type-carriers in proper position, substantially as set forth.

11. The combination with an adding device having rotative adding wheels, a selecting device movable around the adding wheels, and key-actuated means for regulating the length of the effect of the movement of the selecting device, of a type carrier to each adding wheel, links connecting each printing device to move to the same extent as its corresponding adding wheel in the forward axial movement of the selecting device to set the same, and means for re-setting the type carriers on the return movement of the selecting device.

12. In an adding machine, adding wheels, a selector carrying pins and movable about the axis of the adding wheels, keys to adjust the pins, a type carrier, and link connection with each adding wheel, and means operated by the forward axial movement of the selector to set the selected adding wheels and their type carriers to a corresponding extent, and means operating on the return movement of the selector to return the type carriers to position for the next operation.

13. In an adding machine, adding wheels, a selector carrying pins and sliding and also movable about the axis of the adding wheels, keys to adjust the pins, a type carrier to each adding wheel of corresponding numerical order, an impression roller common to all the type carriers, means operatively connecting each type carrier to be moved with its coöperating adding wheel on the forward movement axially of the selector to move the type carriers to an extent corresponding to that of the adding wheel, and means whereby on the return sliding movement of the selector the impression roller is brought in contact with the type carrier.

14. In an adding machine, an adding device adjacent to one end of the machine and having a series of adding wheels, a series of type carriers adjacent to the opposite end of the machine, a selector having movement axially and also adjustable transversely with respect to the adding wheels, and means operated by the axial movement of the selector to simultaneously actuate the adding devices of like numerical order and set the type carriers in operative position for printing.

15. The combination with the adding wheels of an adding mechanism and with the keys thereof, of rocking segments controlled in their movements from the keys and means for turning the wheels from the segments, and a series of type carriers and links connecting each to move with one of the segments, substantially as described.

16. In an adding machine, adding wheels, type carriers corresponding in numerical order with the adding wheels, a selector movable axially about the adding wheels, with means for moving the adding wheels during the forward movement of the selector, links connecting the type carriers of like numerical order with the selectors, and means operated on the return movement of the selectors to restore the type carriers to their initial position.

17. The combination with a series of adding wheels of different numerical orders, of a printing device having a separate type carrier to each adding wheel of corresponding numerical order, a spring motor, means operatively connecting selected adding wheels and corresponding type carriers with the motor to turn said wheels in one direction and move the type carriers with a predetermined length of movement to add and print a given row of figures, and means for disconnecting the type carriers from the adding wheels and resetting the said type carriers by the operation of the motor, substantially as described.

18. The combination with the adder wheels of an adder, of segments arranged to oscillate about the axis of said wheels, means for turning the wheels in one direction from the segments, keys, devices controlled by the keys to determine the extent of movements of the segments, type carriers, and links connecting the carriers and the segments.

19. In an adding machine, adding devices, an oscillating selector carrying pins, keys to adjust the movable pins to positions to engage the adding devices, means for swinging the selector to actuate the adding devices, and means for throwing the movable pins out of operative position at the will of the operator for correcting errors in adjusting the selector.

20. In an adding machine, adding devices, a selector capable of axial movement and carrying movable pins, key-actuated means to adjust the pins to positions to engage the adding devices, a throw-off device arranged to traverse and positively restore the said pins to position before such engagement, and a hand lever for operating said throw-off device.

21. The combination with the adder mechanism and keys of an adding machine, of a hand lever, power actuated means independent of said hand lever, connections whereby the movement of the hand lever in one direction aids to store up power in said means, and devices whereby the movement of the hand lever also operatively connects the adder mechanism and the power actuated means.

22. The combination with the adder wheels, segments, sliding and oscillating selector and series of pins carried thereby, of numeral keys whereby to set the pins of each series in position, an escapement securing a lateral movement of the selector one step on moving a numeral key, a motor, a locking device therefor, an operating handle, and means for winding the motor thereby on operating the handle, to also release the locking device and permit the motor to complete the operation of the machine, substantially as set forth.

23. The combination with an adding device having rotatable adding wheels, of a movable selector operating by a movement around the axis of the adding wheels to actuate the adding device, key-actuated means for adjusting the parts of the selector to determine the extent of the axial movement of the adding wheels, power actuated means for operating the selector, a printing device, and means to vary the extent of movement of the parts of the printing device by the adjustment of the adding wheels.

24. In an adding machine, adding devices, a motor to actuate the adding devices, motor winding means, and a hand lever to store up power in and a device to release the motor for action after a partial movement of the winding means, substantially as set forth.

25. In an adding machine, adding devices, a motor to actuate the adding devices, a hand lever, a locking device for the motor operating on the movement of the hand lever in one direction to release the motor for action, and means actuated by the forward movement of the hand lever to rewind the motor, substantially as set forth.

26. The combination with the adder wheels, selector, and printing devices, of a motor for operating these parts, keys and a lever K and escapement for moving the selector step by step, a rack plate for winding up the motor, a locking device between the plate and lever K, and means for releasing the lock after the plate has made part of its movement, substantially as set forth.

27. The combination with the adding wheels, printing devices, keys and connections, of a motor, a hand lever for storing up power in the motor, and connections for moving the said wheels and devices from the motor to positions determined by the keys, substantially as set forth.

28. The combination with the adding wheels, printing devices, keys, and connections, of a motor and connections for moving the said wheels and devices to positions determined by the keys, a hand lever for winding up said motor, and a governor for controlling the speed of movement, substantially as set forth.

29. The combination with the type wheels and setting devices, of a printing device connected therewith, a motor, and connections whereby the motor moves the said wheels and printing device first in one direction and then in the other with an interval of rest during which the printing is effected, and a hand lever for winding the motor, substantially as set forth.

30. The combination in an adding machine, with keys, a hand lever, and a printing device, of a motor and connections whereby the adding and printing devices are actuated after being set by the keys, and means for storing power in the motor on each movement of the hand lever, and means for locking the motor and for releasing the same on the forward movement of the lever, substantially as set forth.

31. The combination of an adding device, a printing device, a movable selector having pins which by adjustment are adapted to produce variable movement of the adding device from uniformly equal movement of the selector, key-actuated means for adjusting the pins, means operatively connecting the adding and printing devices with the selector, a motor, and means connecting the selector with the motor for operating the selector both longitudinally and axially.

32. The combination with adding and printing devices, of a motor, a movable selector having pins which by adjustment are adapted to variably actuate the adding device, means operatively connecting the selector with the motor for actuating the former both longitudinally and laterally, and a series of keys and means controlled thereby for adjusting the selector and setting it to position to actuate on the adding device, and means connecting each printing device with its corresponding adding device through the selector.

33. The combination of adding wheels, a selector movable both longitudinally and axially in respect to the adding wheels and having pins which by adjustment determine the selection and control the length of movement axially of the adding wheels, a series of keys for adjusting the pins, a motor, means for operatively connecting and disconnecting the motor and the selector, and means for connecting the selector with and disconnecting it from the adding wheels.

34. The combination of adding wheels, a selector carrying pins to engage the adding wheels, keys to adjust the pins in predetermined order of position for selecting and engaging the adding wheels, said selector being movable longitudinally and axially, a spring-actuated motor, means connecting the motor with the selector to move the same axially and longitudinally, and a governor for controlling the movement of the selector.

35. In an adding machine, adding wheels, a selector device carrying pins and movable longitudinally in respect to the wheels, and also about the axis thereof, keys to adjust the pins, a motor, an escapement device controlled by the keys operating to move the selecting device longitudinally, and means connecting the selecting device with the motor, substantially as set forth.

36. In an adding machine, adding wheels, a selector carrying pins and movable longitudinally about the axis of the wheels, keys to adjust the pins, a motor, an escapement device controlled by the keys operating to move the selecting device longitudinally, means connecting the selecting device with the motor, a locking and releasing device adapted to control the action of the motor, and a lever for controlling said releasing device.

37. In an adding machine, a series of adding wheels, a series of type carriers, a selector movable axially about the adding wheels, a motor, means connecting the motor with the selector for imparting successive forward and return movements axially to the selector, and key actuated means for securing the connection of the selector with the adding wheels and their associated type carriers at predetermined points in the forward movement of the selector, an impression roller, means actuated by the motor for bringing the type carriers and impression roller in working contact, and means operating in the return axial movement of the selector to restore the said roller to its initial position and to reset the type carriers after each printing operation.

38. In an adding machine, a series of adding wheels, a series of type carriers, an impression roller movable with relation to the faces of the type carriers, means for setting the adding wheels and their associated type carriers to add and print given figures in a row, a motor, a handle and means for storing power in the motor from said handle, means operatively connecting the motor with the impression roller at the end of the setting operation, and motor driven mechanism operating to reset the type carriers after the printing operation.

39. In an adding machine, a series of adding wheels, a selector, a carrier frame for the selector movable axially about the adding wheels, keys and means actuated therefrom for determining the action of the selector with relation to the adding wheels, power actuated means, and means operated by the power actuated means for moving the carrier frame.

40. In an adding machine, the combination of adding wheels, a selector, means for adjusting the selector to engage the adding wheels in predetermined number and numerical order, a motor, means operatively connecting the motor with the selector, a governor operating to control the rate of motion of the selector, and means controlled by a hand lever for operatively connecting the motor with the selector, a hand lever, and means controlled thereby for operatively connecting the motor with the selector at the beginning and disconnecting it from the same at the end of the operation.

41. In an adding machine, adding mechanism, a selector, key-actuated means for adjusting the selector, a motor, means operatively connecting the selector with the motor, means for locking the motor and for releasing the motor to operate the selector, a motor rewinding means, and a hand lever for operating the rewinding and releasing devices.

42. In an adding machine, adding mechanism including adding wheels, a selector, key-actuated means for changing the position of the selector and adding wheels laterally with respect to each other, an escapement controlled by the same keys, means operatively connecting the selector with the motor, a locking and releasing device in said connecting means, and a hand lever for controlling the releasing device.

43. In an adding machine, adding mechanism including adding wheels, a selector, key-actuated means for determining the adjustment of the selector, a motor, means operatively connecting the motor and the selector, a locking and releasing device, and means for limiting the movement of the motor in one direction, a handle and means for storing power in the motor by the movement of the handle, substantially as set forth.

44. The combination with a series of adding wheels, of a selector movable axially in one direction to set the adding wheels in adding, key actuated means for controlling the lateral relation of the selector to the adding wheels, a rotating motor, and connections actuated by a single rotation of the motor, to rock the selector first in one direction and then in the other, substantially as set forth.

45. The combination with the series of adder wheels, segments mounted between said wheels, and means for vibrating the segments and for turning the adder wheels therefrom in one direction, of pins on said wheels, a shaft provided with arms, means for rocking the said shaft to bring the arms in position to contact the said pins, means for carrying the shaft bodily around the axis of the wheels to carry them to zero, independent type carriers and a connection between each type carrier and one of said segments, 46. The combination with the printing device of an adding machine, of devices for setting said printing devices to print a total, and means for printing a line above the number expressing the total, simultaneously with the printing of the total, substantially as set forth.

47. The combination with the toothed adder wheels and with the pins thereof, of a swinging frame, arms extending into the path of the pins on the adder wheels and carrying pawls for engaging the teeth of the adder wheels, power actuated devices for retaining and operating the arms, detents for limiting the movements of the said arms, and a contacting part upon the swinging frame for shifting the detents to bring the power actuated devices into action upon the arms.

48. The combination with the adding and printing devices, of an adding machine, of means for printing a total, a key controlling said means, and means for printing a line above the total connected to be set in position on moving said key, substantially as set forth.

49. In an adding machine, adding wheels rotatable in one direction about a common axis, a selector, means for variably connecting the selector with the adding devices, a motor for operating the selector, a locking and releasing device for locking the parts after each complete operation, and a lever for operating the said device.

50. In an adding machine, the combination of adding devices operating by a rotative movement about an axis in adding, a selector, a motor for operating the selector axially, means actuated from the same motor for setting the selector transversely of the adding devices, and keys for controlling the extent of such setting movement.

51. In an adding machine, the combination of adding wheels, type carriers separately adjustable on a common axis, power actuated devices, a selector supported to swing about the wheels, means connecting the type carriers with the selector to be moved thereby, and means for swinging the selector from the said power actuated devices.

52. The combination of a spring actuated motor, a rewinding device, adding wheels rotatable in one direction, a single series of keys from zero to 9 inclusive, means adjustable by said keys to operatively connect the adding devices with the motor to be actuated thereby, a locking and releasing device controlling the operations of the motor, and a lever and connections to release the motor for action and operate the rewinding device.

53. The combination with the series of adder wheels, keys, and means by which the respective wheels are severally and properly turned after depressing the keys, of type carriers, and a link connection between each carrier and one of the adder wheels whereby to insure simultaneous movements in one direction while permitting reverse independent movements of the type carriers, substantially as set forth.

54. The combination with the adder wheels, means for carrying them to zero, keys, key levers and connections, of a locking device, and operating means for locking all the key levers in place while the adder wheels are being restored to zero position, substantially as set forth.

55. The combination with the oscillating frame E, of a motor barrel or casing 34, winding means 150, 151, operating lever W, stop device, means operatively connecting the oscillating frame with the barrel comprising a stud 218 on the side of the barrel, pawls 82, 83 pivotally attached to the oscillating frame, and means, cams, operating to throw said pawls alternately in and out of operative position with respect to the stud on the barrel on a complete rotation of the barrel.

56. In an adding and printing machine, a series of type carriers, an impression roller, an impression roller frame movable with relation to the said type carriers, and means to move the frame to bring the roller sharply against the type, and means for then instantly separating the roller and carriers.

57. The combination with the adding mechanism and operating lever of an adding machine, of a rack plate, a motor, means for storing power in the motor from said rack plate, and a full motion device for insuring a complete movement of the rack plate in each direction, substantially as set forth.

58. The combination in an adding machine having keys, adder mechanism and an operating handle, of a motor for actuating said mechanism independently of the operation of the handle, means for storing up the power in the motor on shifting the handle, and means for putting the motor into active connection with the adding mechanism by the movement of the handle.

59. The combination with the adding wheels of an adding machine, of means for setting said wheels to register a total, number keys, a total key, and locking devices whereby the total key is locked after depressing a number key and until a record is made, substantially as set forth.

60. The combination of the adder wheels rotatable in one direction, devices for turning the wheels to zero, number keys, and locking devices whereby the zero devices are locked after a number key is depressed and until the number has been set up in the adder, substantially as set forth.

61. The combination with the number keys and operating handle of an adding machine, of a frame below the keys, a pivoted arm, and connections whereby the latter arm is shifted in position to contact with part of and prevent the rocking of the frame on the movement of the operating handle, substantially as set forth.

62. The combination with the adder mechanism and number keys of an adding machine, of a frame arranged to be rocked on depressing a key and provided with a stop arm, and an arm connected with the adder mechanism to be shifted to obstruct the movement of the stop arm upon the movement of the adder mechanism, substantially as set forth.

63. The combination with the adding devices, keys and motor of an adding machine, of a movable stop arm arranged to be shifted upon depressing a key, an arm 62 and connections whereby the latter is shifted to engage the stop arm upon the movements of the adding mechanism, and a spur upon the arm 62 engaging a part operated by the motor to prevent the return of the arm 62 until the motor has completed its movement, substantially as set forth.

64. The combination with the adder wheels rotatable on one direction, means for turning the same, keys, and connections for adjusting said means, of a restoring device for restoring the parts to position that have been set by the keys, and a locking device for locking the keys during the action of the restoring device, substantially as set forth.

65. The combination with the adder wheels and keys of an adding machine, of a selector provided with pins, means for adjusting them by the operation of the keys, and a swinging blade whereby the pins may be restored by carrying the blade over the pins and between the latter and the adder wheels, substantially as set forth.

66. The combination with the adder wheels and keys of an adding machine, of a selector provided with pins, means for adjusting them by the operation of the keys, a swinging blade whereby the pins may be restored by carrying the blade over the dogs and between the latter and the adder wheels, and a locking device for locking the keys during the movements of the blade, substantially as set forth.

67. The combination with the adder wheels and a rocking frame and means whereby the wheels are turned by the rocking of said frame, of a motor, a stud carried by the said motor, and pawls pivoted to the frame and arranged to be successively engaged by the stud to swing the frame to its different positions, substantially as set forth.

68. The combination of the swinging frame, and its pawls, a motor carrying a stud for engaging the pawls, and a cam plate for controlling the position of the pawls, substantially as set forth.

69. In an adding machine, adding devices, power actuated means connected therewith, keys for controlling the movements of the adding devices, means for locking and releasing the power actuated means, means for restoring power to said power actuated means, a lever, and connections between the same and the said restoring means, and means for simultaneously releasing the power actuated means and operating the restoring means on the same movement of the lever.

70. The combination of the adder wheels rotatable in one direction, keys, a motor for operating the different parts of the mechanism, an escapement for securing a step by step adjustment under the action of the motor controlled by successive actions of the keys, a Geneva stop, and connections for securing the proper relative movements and timing of the parts, substantially as set forth.

71. The combination with the adder wheels and keys of an adding machine, of a lever, an escapement whereby to secure a step by step movement of the lever on successive actions of the keys to set parts in position to operate the adder wheels, and a motor and connections for imparting the movements to the lever as it is released by the escapement, substantially as set forth.

72. The combination with the adder wheels and keys of an adding machine, of a lever, an escapement whereby to secure a step by step movement of the lever on successive actions of the keys to set parts in position to operate the adder wheels, a motor and connections for imparting the movements to the lever as it is released by the escapement, a second lever and lock connecting it to the first, said second lever arranged between the first and the motor to be operated by the latter, and means for shifting the lock when the adding mechanism is to be operated after the adjustment of the first lever by the keys, substantially as set forth.

73. The combination with the lever K and escapement actuated by the keys, of a motor, a lever P, means for reciprocating it from the motor, a locking device for locking the two levers together, and means for shifting the locking device after the adjustment of the lever K by the keys, substantially as set forth.

74. The combination with the adding wheels and keys of an adding machine, of levers K and P, a locking device G, a motor, a shaft 41 driven from said motor, and disks carrying pins 40 arranged to engage the lever P to vibrate the same, substantially as set forth.

75. The combination with the motor of an adding machine, of a hand lever, an oscillating rack plate, and gears between the latter and the hand lever and between the plate and the winding mechanism of the motor, substantially as set forth.

76. The combination of the levers K, P, locking device G, motor, hand lever, and means whereby the locking device is operated to disconnect the levers K, P on the hand lever beginning its movement, substantially as set forth.

77. The combination with the adder wheels, rocking frame and selector carried thereby, of number keys, a lever K, means for moving it step by step by the successive movements of the number keys, and connections between the lever K and the selector for shifting the latter on the movement of the lever K, substantially as set forth.

78. The combination with the levers K and P and rack plate, of a locking device G having a latch with a projection engaging the rack plate, and projections upon the lever P for lifting and releasing the latch plate to lock the parts together, substantially as set forth.

79. The combination in an adding machine of separate adding and printing devices, a movable selector having adjustable pins, key actuated means for adjusting the pins of the selector, and connections between the selector and the printing devices and power actuated means for operating the selector and the printing devices.

80. The combination with adder wheels having series of digits and pins adjacent to the zero point of each series, of segments with contact devices for engaging said pins, means controlled by numeral keys for moving the segments and wheels in one direction, and independent means for turning the wheels to shift the segments by the contact of the pins with the contact devices, substantially as set forth.

81. The combination with adder wheels having series of digits and pins adjacent to the zero point of each series, of segments with contact devices for engaging said pins, means controlled by numeral keys for moving the segments and wheels in one direction, independent means for turning the wheels to shift the segments by the contact of the pins with the contact devices, and type carriers connected with the segments, substantially as set forth.

82. The combination with the adding wheels, printing devices, numeral keys, and means for operating the same in adding, of a repeating key and connections for holding the adding wheels and printing devices at rest while permitting the movements of said operating means, substantially as set forth.

83. The combination with the adding and printing devices, numeral keys, selectors, and means for shifting the selector laterally, of a repeating key and connections whereby to retain the adding and printing devices in position after adding and disconnecting the operating means to permit their movements while actuating the printing devices, substantially as set forth.

84. The combination with the lever K, escapement, selector, and frame Z, of a repeating key and connections for operating the escapement therefrom and for arresting the frame Z and disconnecting the lever from the frame, substantially as set forth.

85. The combination with the selector, frame Z, lever K and escapement, of the repeating key, its lever and connections and a stop for the lever K, substantially as set forth.

86. In an adding machine, a series of adder wheels each provided with a series of numbers from 0 to 9, means for turning the adder wheels continuously in one direction, a printing device, consisting of a series of reciprocable type carriers, and means for setting the carriers during the movements of the wheels in connection with any one series of numbers, substantially as set forth.

87. The combination of the adder wheels each having a plurality of series of numbers, type carriers, means for setting the latter during the movements of the adder wheels in connection with any one series of numbers, and means for securing a total by turning the adding wheels a fraction of a rotation equivalent to the series upon each wheel and for carrying each type carrier to an extent corresponding to the movement of the adder wheel before the adder wheels were turned simultaneously, substantially as set forth.

88. The combination with the adder wheels, segments swinging adjacent to said wheels and type carriers connected with said segments, of means for setting the segments to print a total, and means whereby each segment is moved one step to insure the printing of ciphers, substantially as set forth.

89. The combination with the type wheels, segments and connected type carriers, of a series of overlapping pawls, means for carrying the segments with the type wheels upon which numbers have been added, and means whereby each pawl may be depressed by the action of its coöperating segment to impart one step of movement to the next lower segment, substantially as set forth.

90. The combination in an adding machine, of an operating handle, a series of number keys, springs for lifting the same, and locking devices for locking the operating handle while any key is depressed, substantially as set forth.

91. The combination in an adding machine, of adding devices, keys, an operating handle, power actuated means controlled by said handle, and means whereby the keys are locked as soon as the power actuated means begins its movement, substantially as set forth.

92. The combination with the adding devices of an adding machine, of means for securing a total, a key for securing the operation of said means, means for carrying the adding devices to zero, a key for securing the operation of such means and devices whereby when one key is depressed the other is locked, substantially as set forth.

93. The combination with a movable frame carrying a series of rows of pins, of a series of tappets arranged in a line parallel to that of the row of pins, a series of keys arranged side by side in a line at right angles to said line of tappets, and converging key levers for operating said tappets.

94. The combination with a laterally movable frame carrying parallel series of pins, of a series of keys arranged side by side, a series of hammers arranged in a line at right angles, to the line of keys and parallel to those in which said pins are arranged, and means connecting each key with one of said hammers for operating said hammers.

In testimony whereof I have signed my name to this specification in the presence of two subscribing witnesses.

ADAM HOCH.

Witnesses:
SAMUEL P. JOHNSTON,
SAM B. WHITE.